US010934468B2

(12) United States Patent
Reddy

(10) Patent No.: US 10,934,468 B2
(45) Date of Patent: *Mar. 2, 2021

(54) STORABLE GAS GENERATING COMPOSITIONS

(71) Applicant: Saudi Arabian Oil Company, Dhahran (SA)

(72) Inventor: B. Raghava Reddy, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/807,595

(22) Filed: Mar. 3, 2020

(65) Prior Publication Data

US 2020/0270505 A1 Aug. 27, 2020

Related U.S. Application Data

(62) Division of application No. 16/282,112, filed on Feb. 21, 2019, now Pat. No. 10,590,326.

(51) Int. Cl.
 *C09K 8/38* (2006.01)
(52) U.S. Cl.
 CPC ..................................... *C09K 8/38* (2013.01)
(58) Field of Classification Search
 CPC .... C09K 8/473; C09K 8/487; C09K 2208/20; C09K 2208/32; C09K 8/528; C09K 8/54; C09K 8/62; C09K 8/70; C09K 8/72; C09K 8/38; C09K 2208/10; C09K 8/518; C09K 8/536; C09K 8/58; C09K 8/592; C09K 8/703; E21B 33/13; E21B 43/25; E21B 43/26; E21B 43/24
 See application file for complete search history.

(56) References Cited

U.S. PATENT DOCUMENTS

| 3,933,495 A | 1/1976 | Kondo et al. |
| 4,145,495 A | 3/1979 | Robinson et al. |
| 4,741,844 A * | 5/1988 | Posey, Jr. ................. C09K 8/52 166/307 |
| 6,715,553 B2 * | 4/2004 | Reddy ...................... C09K 8/38 106/672 |
| 6,722,434 B2 | 4/2004 | Reddy et al. |
| 6,858,566 B1 | 2/2005 | Reddy et al. |
| 6,992,048 B2 | 1/2006 | Reddy et al. |
| 7,156,175 B2 | 1/2007 | Reddy et al. |
| 10,150,905 B1 | 12/2018 | Reddy |
| 2003/0220204 A1 * | 11/2003 | Baran, Jr. ................. C09K 8/58 507/200 |
| 2003/0221832 A1 | 12/2003 | Reddy |
| 2005/0222282 A1 | 6/2005 | Nyssen |
| 2006/0084580 A1 | 4/2006 | Santra et al. |
| 2008/0039347 A1 * | 2/2008 | Welton ..................... C09K 8/68 507/213 |
| 2009/0048126 A1 | 2/2009 | Phatak et al. |
| 2012/0175118 A1 | 7/2012 | Khatri et al. |
| 2014/0364343 A1 | 12/2014 | Nelson et al. |
| 2016/0237341 A1 | 8/2016 | Bhamidipati et al. |

FOREIGN PATENT DOCUMENTS

| EP | 2933307 A1 | 10/2015 |
| WO | WO03102107 A1 | 11/2003 |
| WO | WO03102361 A1 | 11/2003 |
| WO | WO2005085586 A1 | 9/2005 |
| WO | WO2016068850 | 5/2016 |
| WO | WO2017018996 A1 | 2/2017 |

OTHER PUBLICATIONS

International Search Report and Written Opinion issued in International Application No. PCT/US2020/019181 dated May 29, 2020, 13 pages.
PCT Invitation to Pay Additional Fees and, Where Application, Protest Fee issued in International Application No. PCT/US2020/019182 dated Jun. 8, 2020, 13 pages.
PCT Invitation to Pay Additional Fees and, Where Application, Protest Fee issued in International Application No. PCT/US2020/019182 on Jun. 8, 2020, 13 pages.
PCT International Search Report and Written Opinion in International Appln. No. PCT/US2020/019182, dated Nov. 12, 2020, 21 pages.

\* cited by examiner

*Primary Examiner* — Kumar R Bhushan
(74) *Attorney, Agent, or Firm* — Fish & Richardson P.C.

(57) ABSTRACT

The present application provides an aqueous fluid containing a gas-generating compound such as an azo compound, a hydrazide compound, or a semicarbazide compound. The aqueous fluid may also contain an amine compound, an oxidizer, or viscosifier, and a foaming surfactant. The aqueous composition may be storable at pH of less than about 5 without any appreciable gas generation, and may be activated to produce gas when mixed with a wellbore fluid for use in downhole applications.

19 Claims, No Drawings

STORABLE GAS GENERATING COMPOSITIONS

CROSS-REFERENCE TO RELATED PATENT APPLICATIONS

This application is a divisional of and claims the benefit of priority to U.S. patent application Ser. No. 16/282,112, filed Feb. 21, 2019, the contents of which are incorporated by reference herein.

TECHNICAL FIELD

This disclosure relates to aqueous fluids containing a gas-generating compound, and in particular to storable aqueous fluids at pH of less than about 5 that may be storable for at least 24 hours and that may be used in wellbore applications.

BACKGROUND

Recoverable fluids, such as hydrocarbons (for example, petroleum or natural gas) and water, are frequently found in subterranean formations. Production of a recoverable fluid from a subterranean formation often requires drilling onto the subterranean formation to produce a wellbore through which the recoverable fluid is brought to the surface. Wellbore fluids, for example, drilling fluids, carrier fluids and fracturing fluids to name a few, are used in the wellbore to perform multiple functions, for example, preventing the fluid influx from formation into the wellbore, removing drill cuttings and debris from the wellbore, perforating the casing, to name a few. Use of a conventional wellbore fluid having constant viscosity and density may lead to certain disadvantages. In one example, sudden changes in formation type and formation strength may lead to varying fracture gradients leading to loss of circulation. In another example, when residual drilling fluid is left behind casing in a completed well, the casing may be susceptible to collapse from sustained casing pressure (SCP) or annular pressure buildup (APB) due to the fluid expansion behind casing. Also, use of a conventional cementing fluid may lead to poor compressibility of set cement to sustain cyclic stresses, poor cement-to-casing bond, and to formation of microannuli. Therefore, issues associated with the wellbore fluids can reduce well productivity and increase well maintenance costs.

SUMMARY

In some embodiments, the present disclosure provides an aqueous gas-generating composition containing a gas-generating compound (for example, an azo compound, a hydrazide compound, or semicarbazide compound). The composition is stable and may be stored for a prolonged period of time without premature gas generation. In one example, the composition may be prepared ahead of a wellbore operation, and stored until the time it is needed. In another example, the composition may be prepared immediately before the wellbore application. A liquid injection pump can be utilized to inject the gas-generating composition into a wellbore treatment on-the-fly in a continuous operation, or the gas-generating composition can be batch mixed into a wellbore fluid, and then activated, for example, by adjusting pH of the wellbore fluid, or adding an oxidizer immediately before pumping the fluid downhole, or both.

The following units of measure have been used in this disclosure:

| Unit | Description |
| --- | --- |
| Wt. % | Percentage weight |
| kPa | Kilopascal |
| Da | Dalton |
| cP | Centipoise |
| nm | Nanometer |
| μm | Micrometer |
| pcf | Pound force per cubic foot |

In a first general aspect, the present application provides an aqueous composition comprising an azo compound of Formula (I)

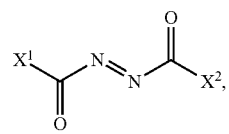

(I)

or a salt of the same. $X^1$ and $X^2$ are each independently selected from $C_{1-6}$ alkyl, $C_{2-6}$ alkenyl, $C_{2-6}$ alkynyl, $OR^{a1}$, and $NR^{c1}R^{d1}$. Each $R^{a1}$, $R^{c1}$, and $R^{d1}$ is independently selected from H, $C_{1-6}$ alkyl, $C_{2-6}$ alkenyl, $C_{2-6}$ alkynyl, $C_{3-7}$ cycloalkyl, and $C_{6-10}$ aryl. The pH of the composition is less than about 5. Certain implementations of the first general aspect are described later.

In some embodiments, $X^1$ and $X^2$ are each independently selected from $OR^{a1}$ and $NR^{c1}R^{d1}$. Each $R^{a1}$, $R^{c1}$ and $R^{d1}$ is independently selected from H and $C_{1-6}$ alkyl.

In some embodiments, the azo compound is azodicarbonamide, or a salt of the same.

In some embodiments, pH of the composition is less than about 4.

In some embodiments, an amount of the azo compound in the aqueous composition is from about 1 wt. % to about 10 wt. %.

In some embodiments, the aqueous composition of the first general aspect comprises an amine compound which is a primary, secondary or tertiary amine of Formula (IVa)

(IVa)

or a salt of the same.

$R^{n1}$, $R^{n2}$ and $R^{n3}$ are independently selected from H, $C_{1-6}$ alkyl, $C_{3-7}$ cycloalkyl, and 4-7 membered heterocycloalkyl, each of which is optionally substituted with 1, 2, or 3 substituents independently selected from hydroxyl, $C_{1-6}$ alkoxy, amino, $C_{1-6}$ alkylamino, di($C_{1-6}$ alkyl)amino, carboxy, and carbamyl, or any two $R^{n1}$ and $R^{n2}$, or any two $R^{n2}$ and $R^{n3}$, or any two $R^{n1}$ and $R^{n3}$ together with the N atom to which they are attached form a 4-7 membered heterocycloalkyl, which is optionally substituted with 1, 2, 3, 4, or 5 substituents independently selected from $C_{1-6}$ alkyl, $NH_2$—$C_{1-6}$ alkylene, OH—$C_{1-6}$ alkylene, hydroxyl, $C_{1-6}$ alkoxy, amino, $C_{1-6}$ alkylamino, di($C_{1-6}$ alkyl)amino, carboxy, and carbamyl.

In some embodiments, $R^{n1}$, $R^{n2}$ and $R^{n3}$ are independently selected from H and $C_{1-6}$ alkyl, which is optionally substituted with 1, 2, or 3 substituents independently selected from hydroxyl, $C_{1-6}$ alkoxy, amino, $C_{1-6}$ alkylamino, di($C_{1-6}$ alkyl)amino, and carboxy.

In some embodiments, the amine compound is triethanolamine, or a salt of the same.

In some embodiments, the aqueous composition of the first general aspect comprises an amine compound which is a hydrazine compound of Formula (IVb)

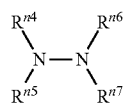
(IVb)

or a salt of the same. $R^{n4}$, $R^{n5}$, $R^{n6}$, and $R^{n7}$ are independently selected from H, $C_{1-6}$ alkyl, $C_{3-7}$ cycloalkyl, and 4-7 membered heterocycloalkyl, each of which is optionally substituted with 1, 2, or 3 substituents independently selected from hydroxyl, $C_{1-6}$ alkoxy, amino, $C_{1-6}$ alkylamino, di($C_{1-6}$ alkyl)amino, carboxy, and carbamyl, or any two $R^{n4}$ and $R^{n5}$, or any two $R^{n6}$ and $R^{n7}$, together with the N atom to which they are attached form a 4-7 membered heterocycloalkyl, which is optionally substituted with 1, 2, 3, 4, or 5 substituents independently selected from $C_{1-6}$ alkyl, hydroxyl, $C_{1-6}$ alkoxy, amino, $C_{1-6}$ alkylamino, di($C_{1-6}$ alkyl)amino, carboxy and, carbamyl.

In some embodiments, $R^{n4}$, $R^{n5}$, $R^{n6}$, and $R^{n7}$ are independently selected from H and $C_{1-6}$ alkyl, which is optionally substituted with 1, 2, or 3 substituents independently selected from hydroxyl, $C_{1-6}$ alkoxy, amino, $C_{1-6}$ alkylamino, di($C_{1-6}$ alkyl)amino, and carboxy.

In some embodiments, the hydrazine compound is selected from hydrazine, hydrazine monohydrobromide, hydrazine hydrate, hydrazine sulfate, hydrazine acetate, hydrazine dihydrochloride, hydrazine monohydrochloride, and hydrazine acetate.

In some embodiments, the aqueous composition of the first general aspect comprises an amine compound which is an ethyleneimine compound of Formula (IVc)

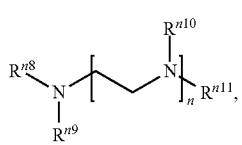
(IVc)

or a salt of the same, where n is an integer from 1 to 10, $R^{n8}$, $R^{n9}$, $R^{n10}$, and $R^{n11}$ are independently selected from H, $C_{1-6}$ alkyl, $C_{3-7}$ cycloalkyl, and 4-7 membered heterocycloalkyl, each of which is optionally substituted with 1, 2, or 3 substituents independently selected from hydroxyl, $C_{1-6}$ alkoxy, amino, $C_{1-6}$ alkylamino, di($C_{1-6}$ alkyl)amino, carboxy, and carbamyl, or any two $R^{n8}$ and $R^{n9}$, or any two $R^{n10}$ and $R^{n11}$, together with the N atom to which they are attached form a 4-7 membered heterocycloalkyl, which is optionally substituted with 1, 2, 3, 4, or 5 substituents independently selected from $C_{1-6}$ alkyl, $NH_2$—$C_{1-6}$ alkylene, OH—$C_{1-6}$ alkylene, hydroxyl, $C_{1-6}$ alkoxy, amino, $C_{1-6}$ alkylamino, di($C_{1-6}$ alkyl)amino, carboxy, and carbamyl.

In some embodiments, n is an integer from 1 to 8, and $R^{n8}$, $R^{n9}$, $R^{n10}$ and $R^{n11}$ are independently selected from H and $C_{1-6}$ alkyl, which is optionally substituted with 1, 2, or 3 substituents independently selected from amino, $C_{1-6}$ alkylamino, di($C_{1-6}$ alkyl)amino, carboxy, and carbamyl.

In some embodiments, the ethyleneimine compound is selected from ethylene diamine (EDA), tetraethylene pentamine (TEPA), diethyletriamine (DETA), and polyethyleneimine, or a salt of the same.

In some embodiments, the aqueous composition of the first general aspect comprises an amine compound which is a hydrazide compound of Formula (IIa) or Formula (IIb)

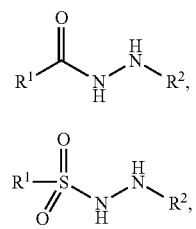

or a salt of the same, where $R^1$ is selected from H, $C_{1-6}$ alkyl, $C_{6-10}$ aryl, and —NH—$NH_2$, where said $C_{6-10}$ aryl is optionally substituted with 1, 2, or 3 substituents independently selected from $C_{1-6}$ alkyl, hydroxyl, amino, $C_{1-6}$ alkoxy, and $NO_2$, and $R^2$ is selected from H, $C_{1-6}$ alkyl, carboxy, carbamyl, $C_{1-6}$ alkylcarbamyl, di($C_{1-6}$-alkyl)carbamyl, aminosulfonyl, $C_{1-6}$ alkylaminosulfonyl, and di($C_{1-6}$ alkyl)aminosulfonyl.

In some embodiments, $R^1$ is selected from $C_{6-10}$ aryl and —NH—$NH_2$, where said $C_{6-10}$ aryl is optionally substituted with 1, 2, or 3 substituents independently selected from $C_{1-6}$ alkyl and $NO_2$; and $R^2$ is selected from H, carboxy, carbamyl, and aminosulfonyl.

In some embodiments, the hydrazide compound is selected from carbohydrazide and p-toluenesulfonyl hydrazide, or a salt of the same.

In some embodiments, an amount of the amine compound in the aqueous composition is from about 1 wt. % to about 10 wt. %.

In some embodiments, the composition comprises a viscosifier selected from diutan and xanthan, and a hydroxy sulfobetaine group-containing foaming surfactant.

In some embodiments, the composition of the first general aspect is stable and storable without producing any substantial amount of gas for at least 24 hours. In this context, the term "substantial amount of gas" means that any quantity of gas that is produced is considered negligible.

In a second general aspect, the present disclosure provides a method of modulating density of a wellbore fluid, the method comprising adding an aqueous composition of the first general aspect to the wellbore fluid. Certain implementations of the second general aspect are described later:

In some embodiments, pH of the wellbore fluid after addition of the aqueous composition of the first general aspect is greater than about 5.

In some embodiments, pH of the fluid is greater than about 7.

In some embodiments, the method of the second general aspect includes adding to the wellbore fluid a composition comprising an oxidizing compound.

In some embodiments, the oxidizing compound is selected from: a peroxysulfate, a peroxycarbonate, a peroxyborate, a peroxide, a hypochlorite, and an organic peracid.

In a third general aspect, the present disclosure provides an aqueous composition comprising a hydrazide compound of Formula (IIa) or Formula (IIb)

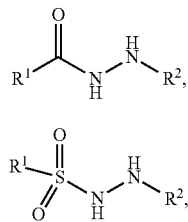

(IIa)

(IIb)

or a salt of the same, where $R^1$ is selected from H, $C_{1-6}$ alkyl, $C_{6-10}$ aryl, and —NH—NH$_2$, where said $C_{6-10}$ aryl is optionally substituted with 1, 2, or 3 substituents independently selected from $C_{1-6}$ alkyl, hydroxyl, amino, $C_{1-6}$ alkoxy, and NO$_2$, $R^2$ is selected from H, $C_{1-6}$ alkyl, carboxy, carbamyl, $C_{1-6}$ alkylcarbamyl, di($C_{1-6}$-alkyl)carbamyl, aminosulfonyl, $C_{1-6}$ alkylaminosulfonyl, and di($C_{1-6}$ alkyl)aminosulfonyl, and pH of the composition is less than about 5. Certain implementations of the third general aspect are described later:

In some embodiments, $R^1$ is selected from $C_{6-10}$ aryl and —NH—NH$_2$, where said $C_{6-10}$ aryl is optionally substituted with 1, 2, or 3 substituents independently selected from $C_{1-6}$ alkyl and NO$_2$; and $R^2$ is selected from H, carboxy, carbamyl, and aminosulfonyl.

In some embodiments, the hydrazide compound is selected from carbohydrazide and p-toluenesulfonyl hydrazide, or a salt of the same.

In some embodiments, pH of the composition is less than about 4.

In some embodiments, an amount of the hydrazide compound in the composition is from about 1 wt. % to about 10 wt. %.

In some embodiments, the composition comprises a viscosifier selected from diutan and xanthan, and a hydroxy sulfobetaine group-containing foaming surfactant.

In some embodiments, the composition comprises an amine compound selected from a primary, secondary or tertiary amine of Formula (IVa), a hydrazine compound of Formula (IVb), and an ethyleneimine compound of Formula (IVc), or a salt of the same, in an amount from about 1 wt. % to about 10 wt. %.

In some embodiments, the composition of the third general aspect is stable and storable without producing any substantial amount of gas for at least 24 hours.

In a fourth general aspect, the present disclosure provides method of modulating density of a wellbore fluid, the method comprising adding an aqueous composition of the third general aspect to the wellbore fluid. Certain implementations of the fourth general aspect are described later:

In some embodiments, pH of the wellbore fluid after addition of the aqueous composition of the third general aspect is greater than about 5.

In some embodiments, pH of the fluid is greater than about 7.

In some embodiments, the method of the fourth general aspect includes adding to the wellbore fluid a composition comprising an oxidizing compound.

In some embodiments, the oxidizing compound is selected from: a peroxysulfate, a peroxycarbonate, a peroxyborate, a peroxide, a hypochlorite, and an organic peracid.

In some embodiments, the oxidizing compound is present in the composition in about 1:1 molar ratio with respect to the hydrazide compound.

In a fifth general aspect, the present disclosure provides an aqueous composition comprising a semicarbazide compound of Formula (III)

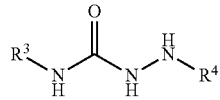

(III)

or a salt of the same, where $R^3$ is selected from H, $C_{1-6}$ alkyl, and $C_{6-10}$ aryl, $R^4$ is selected from H, $C_{1-6}$ alkyl, carboxy, carbamyl, $C(=O)C_{1-6}$ alkyl, $C(=O)C_{6-10}$ aryl, $S(=O)_2C_{1-6}$ alkyl, and $S(=O)_2C_{6-10}$ aryl. Each $C_{6-10}$ aryl group in $R^3$ or $R^4$ is optionally substituted with 1, 2, or 3 substituents independently selected from $C_{1-6}$ alkyl, hydroxyl, amino, $C_{1-6}$ alkoxy, and NO$_2$. The pH of the composition is less than about 5. Certain implementations of the fifth general aspect are described later.

In some embodiments, $R^4$ is selected from H, $C_{1-6}$ alkyl, carboxy, carbamyl, aminosulfonyl, $C(=O)C_{1-6}$ alkyl, $C(=O)C_{6-10}$ aryl, $S(=O)_2C_{1-6}$ alkyl, and $S(=O)_2C_{6-10}$ aryl; where each $C_{6-10}$ aryl group in $R^3$ or $R^4$ is optionally substituted with 1, 2, or 3 substituents independently selected from $C_{1-6}$ alkyl and NO$_2$.

In some embodiments, the semicarbazide compound is selected from hydrazinecarboxamide and p-toluenesulfonyl semicarbazide.

In some embodiments, pH of the composition is less than about 4.

In some embodiments, an amount of the semicarbazide compound in the composition is from about 1 wt. % to about 10 wt. %.

In some embodiments, the composition comprises a viscosifier selected from diutan and xanthan, and a hydroxy sulfobetaine group-containing foaming surfactant.

In some embodiments, the composition comprises an amine compound selected from a primary, secondary or tertiary amine of Formula (IVa), a hydrazine compound of Formula (IVb), and an ethyleneimine compound of Formula (IVc), or a salt of the same, in an amount from about 1 wt. % to about 10 wt. %.

In some embodiments, the composition of the fifth general aspect is stable and storable without producing any substantial amount of gas for at least 24 hours.

In a sixth general aspect, the present disclosure provides a method of modulating density of a wellbore fluid, the method comprising adding an aqueous composition of the fifth general aspect to a wellbore fluid. Certain implementations of the sixth general aspect are described later.

In some embodiments, pH of the wellbore fluid after addition of the aqueous composition of the fifth general aspect is greater than about 5.

In some embodiments, pH of the fluid is greater than about 7.

In some embodiments, the method of the sixth general aspect includes adding to the wellbore fluid a composition comprising an oxidizing compound.

In some embodiments, the oxidizing compound selected from: a peroxysulfate, a peroxycarbonate, a peroxyborate, a peroxide, a hypochlorite, and an organic peracid.

In some embodiments, the oxidizing compound is present in the composition in about 1:1 molar ratio with respect to the semicarbazide compound.

Unless otherwise defined, all technical and scientific terms used herein have the same meaning as commonly understood by one of ordinary skill in the art to which the present application belongs. Methods and materials are described herein for use in the present application; other, suitable methods and materials known in the art can also be used. The materials, methods, and examples are illustrative only and not intended to be limiting.

Other features and advantages of the present application will be apparent from the following detailed description and figures, and from the claims.

"Intentionally Left Blank"

DETAILED DESCRIPTION

Incompressible wellbore fluids having constant volume and density may lead to pressure gradient in the wellbore due to sudden change in the strength and type of subterranean formation along the length of the wellbore. This pressure gradient may lead to the loss of circulation of the wellbore fluid, for example, a cement slurry, and may result in incomplete zonal isolation, leading to sustained casing pressure (SCP) or fluid build up behind casing and making the casing susceptible to collapse. Hence, in some applications, wellbore fluids, for example, drilling fluids, with compressibility and on-demand, variable density may be needed, to maintain recirculation. Controlled compressibility may be also desired in wellbore set cement applications. In primary cementing, inclusion of small amounts of gas in the cement mixture may be advantageous for improved resiliency and reduced brittleness of set cement.

Accordingly, the present application provides a composition containing a gas-generating compound, which is stable and storable for a prolonged period of time, and which can generate gas (for example, $N_2$) on-demand, for example, after addition to a wellbore fluid. Example embodiments of such compositions, and methods of making and using these compositions, are described herein.

Definitions

As used in this application, the singular forms "a," "an," and "the" include plural referents unless the context clearly dictates otherwise.

As used in this application, the term "about" means "approximately" (for example, plus or minus approximately 10% of the indicated value).

As used in this application, the term "room temperature" refers to a temperature of about 15° C. to about 28° C.

As used in this application, the term "standard temperature and pressure" refers to 20° C. and 101 kPa.

As used in this application, the term "compressibility" refers to a measure of the relative volume change of a fluid as a response to a pressure. The term compressibility describes the ability of a fluid to be compacted (made more dense). For examples, fluid may be 10 v/v %, 20 v/v %, 30 v/v %, 40 v/v %, or 50 v/v % compressible. An incompressible fluid cannot be compressed and has relatively constant volume and density throughout.

As used in this application, the term "azo compound" refers to a compound containing an azo group of formula —N=N—.

As used in this application, the term "hydrazide compound" refers to a compound containing a hydrazide group of formula —C(=O)NHNH— or —S(=O)$_2$NHNH—.

As used in this application the term "semicarbazide compound" refers to a compound containing a semicarbazide group of formula —NHC(=O)NHNH—.

As used in this application, the term "oxidizing compound" refers to a chemical substance that has the ability to cause other substances to lose electrons. Examples of oxidizers include oxygen, hydrogen peroxide and the halogens.

As used in this application, the term "carbamyl" refers to a group of formula —C(O)NH$_2$.

As used in this application, the term "$C_{n-m}$ alkylcarbamyl" refers to a group of formula —C(O)—NH($C_{n-m}$ alkyl), where the alkyl group has n to m carbon atoms.

As used in this application, the term "di($C_{n-m}$-alkyl) carbamyl" refers to a group of formula —C(O)N($C_{n-m}$ alkyl)$_2$, where the two alkyl groups each has, independently, n to m carbon atoms. In some embodiments, each alkyl group independently has 1 to 6, 1 to 4, or 1 to 3 carbon atoms.

As used in this application, the term "aminosulfonyl" refers to a group of formula —S(O)$_2$NH$_2$.

As used in this application, the term "$C_{n-m}$ alkylaminosulfonyl" refers to a group of formula —S(O)$_2$NH($C_{n-m}$ alkyl), where the alkyl group has n to m carbon atoms. In some embodiments, the alkyl group has 1 to 6, 1 to 4, or 1 to 3 carbon atoms.

As used in this application, the term "di($C_{n-m}$ alkyl) aminosulfonyl" refers to a group of formula —S(O)$_2$N($C_{n-m}$ alkyl)$_2$, where each alkyl group independently has n to m carbon atoms. In some embodiments, each alkyl group has, independently, 1 to 6, 1 to 4, or 1 to 3 carbon atoms.

As used in this application, the term "$C_{n-m}$ alkyl", employed alone or in combination with other terms, refers to a saturated hydrocarbon group that may be straight-chain (linear) or branched, having n to m carbons. Examples of alkyl moieties include, but are not limited to, chemical groups such as methyl, ethyl, n-propyl, isopropyl, n-butyl, tert-butyl, isobutyl, sec-butyl; greater homologs such as 2-methyl-1-butyl, n-pentyl, 3-pentyl, n-hexyl, 1,2,2-trimethylpropyl. In some embodiments, the alkyl group contains from 1 to 6 carbon atoms, from 1 to 4 carbon atoms, from 1 to 3 carbon atoms, or 1 to 2 carbon atoms. The term "$C_{n-m}$ alkylene" refers to a divalent alkyl group. Examples of alkylene groups include ethan-1,1-diyl, ethan-1,2-diyl, propan-1,1,-diyl, propan-1,3-diyl, propan-1,2-diyl, butan-1,4-diyl, butan-1,3-diyl, butan-1,2-diyl, 2-methyl-propan-1,3-diyl.

As used in this application, "$C_{n-m}$ alkenyl" refers to an alkyl group having one or more double carbon-carbon bonds and having n to m carbons. Examples of alkenyl groups include, but are not limited to, ethenyl, n-propenyl, isopropenyl, n-butenyl, sec-butenyl. In some embodiments, the alkenyl moiety contains 2 to 6, 2 to 4, or 2 to 3 carbon atoms.

As used in this application, "$C_{n-m}$ alkynyl" refers to an alkyl group having one or more triple carbon-carbon bonds and having n to m carbons. Example alkynyl groups include, but are not limited to, ethynyl, propyn-1-yl, propyn-2-yl. In some embodiments, the alkynyl moiety contains 2 to 6, 2 to 4, or 2 to 3 carbon atoms.

As used in this application, "$C_{n-m}$ cycloalkyl" refers to non-aromatic cyclic hydrocarbons including cyclized alkyl or alkenyl groups. Cycloalkyl groups can include mono- or polycyclic (for example, having 2, 3 or 4 fused rings) groups and spirocycles. Ring-forming carbon atoms of a cycloalkyl group can be optionally substituted by 1 or 2 independently selected oxo or sulfide groups (for example, C(O) or C(S)). Also included in the definition of cycloalkyl are moieties that have one or more aromatic rings fused (for example, having a bond in common with) to the cycloalkyl ring, for example, benzo or thienyl derivatives of cyclopentane, cyclohexane. A cycloalkyl group containing a fused aromatic ring can be attached through any ring-forming atom including a ring-forming atom of the fused aromatic ring. Cycloalkyl groups can have 3, 4, 5, 6, 7, 8, 9, or 10 ring-forming carbons ($C_{3-10}$). In some embodiments, the cycloalkyl is a $C_{3-10}$ monocyclic or bicyclic cyclocalkyl. In some embodiments, the cycloalkyl is a $C_{3-7}$ monocyclic cyclocalkyl. Example cycloalkyl groups include cyclopropyl, cyclobutyl, cyclopentyl, cyclohexyl, cycloheptyl, cyclopentenyl, cyclohexenyl, cyclohexadienyl, cycloheptatrienyl, norbornyl, norpinyl, norcarnyl, adamantyl. In some embodiments, cycloalkyl is cyclopropyl, cyclobutyl, cyclopentyl, or cyclohexyl.

As used in this application, "heterocycloalkyl" or "aliphatic heterocycle" refers to non-aromatic saturated or unsaturated monocyclic or polycyclic heterocycles having one or more ring-forming heteroatoms selected from O, N, or S. Included in heterocycloalkyl are monocyclic 4-, 5-, 6-, 7-, 8-, 9- or 10-membered heterocycloalkyl groups. Heterocycloalkyl groups can also include spirocycles. Example heterocycloalkyl groups include pyrrolidin-2-one, 1,3-isoxazolidin-2-one, pyranyl, tetrahydropuran, oxetanyl, azetidinyl, morpholino, thiomorpholino, piperazinyl, tetrahydrofuranyl, tetrahydrothienyl, piperidinyl, pyrrolidinyl, isoxazolidinyl, isothiazolidinyl, pyrazolidinyl, oxazolidinyl, thiazolidinyl, imidazolidinyl, azepanyl, benzazapene. Ring-forming carbon atoms and heteroatoms of a heterocycloalkyl group can be optionally substituted by oxo or sulfido groups (for example, C(O), S(O), C(S), or S(O)$_2$). The heterocycloalkyl group can be attached through a ring-forming carbon atom or a ring-forming heteroatom. In some embodiments, the heterocycloalkyl group contains 0 to 3 double bonds. In some embodiments, the heterocycloalkyl group contains 0 to 2 double bonds. In some embodiments, the heterocycloalkyl group is unsaturated (for example, the heterocycloalkyl contains at least one double bond). Also included in the definition of heterocycloalkyl are moieties that have one or more aromatic rings fused (for example, having a bond in common with) to the non-aromatic heterocycle, for example, benzo or thienyl derivatives of piperidine, morpholine, azepine. A heterocycloalkyl group containing a fused aromatic ring can be attached through any ring-forming atom including a ring-forming atom of the fused aromatic ring. In some embodiments, the heterocycloalkyl is a monocyclic 4-6 membered heterocycloalkyl having 1 or 2 heteroatoms independently selected from nitrogen, oxygen, or sulfur and having one or more oxidized ring members. In some embodiments, the heterocycloalkyl is a monocyclic or bicyclic 4-10 membered heterocycloalkyl having 1, 2, 3, or 4 heteroatoms independently selected from nitrogen, oxygen, or sulfur and having one or more oxidized ring members. In some embodiments, the heterocycloalkyl is a 8-12-membered heterocycloalkyl (for example, bicyclic heterocycloalkyl). In some embodiments, the heterocycloalkyl is a 8-16-membered heterocycloalkyl (for example, bicyclic or tricyclic heterocycloalkyl). In some embodiments, the 8-12 membered bicyclic heterocycloalkyl is a 8-12 membered fused heterocycloalkylaryl group or a 8-12 membered fused heterocycloalkylheteroaryl group. In some embodiments, the heterocycloalkyl is a 9-12 membered bicyclic heterocycloalkyl. In some embodiments, the 9-10 membered bicyclic heterocycloalkyl is a 9-10 membered fused heterocycloalkylaryl group or a 9-10 membered fused heterocycloalkylheteroaryl group. The term "heterocycloalkylene" refers to a divalent heterocycloalkyl linking group.

As used in this application, the term "aryl," employed alone or in combination with other terms, refers to an aromatic hydrocarbon group, which may be monocyclic or polycyclic (for example, having 2, 3 or 4 fused rings). The term "$C_{n-m}$ aryl" refers to an aryl group having from n to m ring carbon atoms. Aryl groups include, for example, phenyl, naphthyl, anthracenyl, phenanthrenyl, indanyl, indenyl. In some embodiments, aryl groups have from 6 to 10 carbon atoms. In some embodiments, the aryl group is phenyl or naphthyl.

As used in this application, the term "hydroxyl" refers to a group of formula —OH.

As used in this application, the term "carboxy" refers to a —C(O)OH group.

As used in this application, the term "$C_{n-m}$ alkoxy", employed alone or in combination with other terms, refers to a group of formula —O-alkyl, win this application the alkyl group has n to m carbons. Example alkoxy groups include, but are not limited to, methoxy, ethoxy, propoxy (for example, n-propoxy and isopropoxy), butoxy (for example, n-butoxy and tert-butoxy), and the like. In some embodiments, the alkyl group has 1 to 6, 1 to 4, or 1 to 3 carbon atoms.

As used in this application, the term "amino" refers to a group of formula —NH$_2$.

As used in this application, the term "$C_{n-m}$ alkylamino" refers to a group of formula —NH(alkyl), win this application the alkyl group has n to m carbon atoms. In some embodiments, the alkyl group has 1 to 6, 1 to 4, or 1 to 3 carbon atoms. Examples of alkylamino groups include, but are not limited to, N-methylamino, N-ethylamino, N-propylamino (for example, N-(n-propyl)amino and N-isopropylamino), N-butylamino (for example, N-(n-butyl)amino and N-(tert-butyl)amino), and the like.

As used in this application, the term "di($C_{n-m}$ alkyl) amino" refers to a group of formula —N(alkyl)$_2$, win this application each alkyl group independently has n to m carbon atoms. In some embodiments, each alkyl group has 1 to 6, 1 to 4, or 1 to 3 carbon atoms. Examples of dialkylamino groups include, but are not limited to, N,N-methylehtylamino, N,N-diethylamino, N,N-propylethylamino, N,N-butylisopropylamino, and the like.

As used in this application, the term "$C_{n-m}$ alkylcarbonylamino" refers to a group of formula —NHC(O)-alkyl, win this application the alkyl group has n to m carbon atoms. In some embodiments, the alkyl group has 1 to 6, 1 to 4, or 1 to 3 carbon atoms.

As used in this application, the term "$C_{n-m}$ alkylsulfonylamino" refers to a group of formula —NHS(O)$_2$-alkyl, win this application the alkyl group has n to m carbon atoms. In some embodiments, the alkyl group has 1 to 6, 1 to 4, or 1 to 3 carbon atoms.

As used in this application, the term "aminosulfonylamino" refers to a group of formula —NHS(O)$_2$NH$_2$.

As used in this application, the term "$C_{n-m}$ alkylaminosulfonylamino" refers to a group of formula —NHS(O)$_2$NH(alkyl), win this application the alkyl group has n to m carbon atoms. In some embodiments, the alkyl group has 1 to 6, 1 to 4, or 1 to 3 carbon atoms.

As used in this application, the term "di($C_{n-m}$ alkyl) aminosulfonylamino" refers to a group of formula —NHS(O)$_2$N(alkyl)$_2$, win this application each alkyl group independently has n to m carbon atoms. In some embodiments, each alkyl group has, independently, 1 to 6, 1 to 4, or 1 to 3 carbon atoms.

As used in this application, the term "aminocarbonylamino", employed alone or in combination with other terms, refers to a group of formula —NHC(O)NH$_2$.

As used in this application, the term "C$_{n-m}$ alkylaminocarbonylamino" refers to a group of formula —NHC(O)NH(alkyl), win this application the alkyl group has n to m carbon atoms. In some embodiments, the alkyl group has 1 to 6, 1 to 4, or 1 to 3 carbon atoms.

As used in this application, the term "di(C$_{n-m}$ alkyl) aminocarbonylamino" refers to a group of formula —NHC(O)N(alkyl)$_2$, win this application each alkyl group independently has n to m carbon atoms. In some embodiments, each alkyl group has, independently, 1 to 6, 1 to 4, or 1 to 3 carbon atoms.

As used in this application, the term "hydroxy sulfobetaine" refers to a moiety of formula:

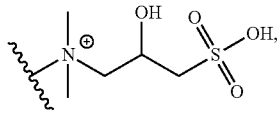 [SMILES: *[N+](C)(C)CC(O)CS(=O)(=O)O]

or a salt of the same. In some embodiments, a salt of the hydroxy sulfobetaine moiety is the sodium salt. The squiggly line represents a surface to which the hydroxyl sulfobetaine can bind.

The term "downhole" as used in this application refers to under the surface of the earth, such as a location within or fluidly connected to a wellbore.

As used in this application, the term "drilling fluid" refers to fluids, slurries, or muds used in drilling operations downhole, such as during the formation of the wellbore.

As used in this application, the term "stimulation fluid" refers to fluids or slurries used downhole during stimulation activities of the well that can increase the production of a well, including perforation activities. In some examples, a stimulation fluid can include a fracturing fluid or an acidizing fluid.

As used in this application, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake (mudcake).

As used in this application, the term "fracturing fluid" refers to fluids or slurries used downhole during fracturing operations.

As used in this application, the term "completion fluid" refers to fluids or slurries used downhole during the completion phase of a well, including cementing compositions.

As used in this application, the term "remedial treatment fluid" refers to fluids or slurries used downhole for remedial treatment of a well. Remedial treatments can include treatments designed to increase or maintain the production rate of a well, such as stimulation or clean-up treatments.

As used in this application, the term "cementing fluid" refers to fluids or slurries used during cementing operations of a well. For example, a cementing fluid can include an aqueous mixture including at least one of cement and cement kiln dust. In another example, a cementing fluid can include a curable resinous material.

As used in this application, a "carrier fluid" refers to any suitable fluid for suspending, dissolving, mixing, or emulsifying with one or more materials (solid particular materials) to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a C$_2$-C$_{40}$ fatty acid C$_1$-C$_{40}$ alkyl ester (for example, a fatty acid methyl ester), 2-butoxy ethanol, butyl acetate, butyl lactate, furfuryl acetate, dimethyl sulfoxide, dimethyl formamide, a petroleum distillation product of fraction (for example, diesel, kerosene, naphthas, and the like) mineral oil, a hydrocarbon oil, a hydrocarbon including an aromatic carbon-carbon bond (for example, benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (for example, cyclohexanone, hexane), water, brine, produced water, flowback water, brackish water, and sea water. The fluid can form about 0.001 wt. % to about 99.999 wt. % of a composition, or a mixture including the same, or about 0.001 wt. % or less, 0.01 wt. %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt. % or more.

As used in this application, the term "fluid" refers to liquids, gases or combinations of them, unless otherwise indicated.

As used in this application, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any subsurface region that can produce liquid or gaseous petroleum materials, water, or any section subsurface in fluid contact therewith. For example, a subterranean formation or material can be at least one of an area desired to be fractured, a fracture or an area surrounding a fracture, and a flow pathway or an area surrounding a flow pathway, win this application a fracture or a flow pathway can be optionally fluidly connected to a subterranean petroleum- or water-producing region, directly or through one or more fractures or flow pathways.

As used in this application, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

Introduction

In general, the disclosure provides various gas-generating compositions that may be storable for a prolonged period of time. Such compositions may be added to a wellbore fluid, and may generate gas in the wellbore fluid upon activation.

In one general aspect, the aqueous gas-generating compositions may be considered to be in two different general categories:

(1) those that contain an azo compound; and
(2) those that contain a hydrazide compound or a semicarbazide compound.

A composition of any of the two general categories may contain an organic amine, an acid, a viscosifier, a foaming or foam stabilizing surfactant, an oxidizing compound, at least one additional ingredient, or any combination of the same. In some embodiments, an azo compound-containing composition of category (1) may also contain a hydrazide compound or a semicarbazide compound, in addition to any other components described herein.

Various embodiments of the azo compounds, hydrazide compounds, semicarbazide compounds, organic amines, acids, viscosifiers, foaming or foam stabilizing surfactants, oxidizing compounds, additional ingredients, as well as their amounts in the compositions of both of the two general categories, are described later.

Azo Compound Containing Compositions of Category (1)

In general, an azo compound-containing composition includes an azo compound, such as azodicarbonamide, which may be dissolved or dispersed in the aqueous solvent. In some embodiments, an azo compound is the only ingredient in the aqueous composition. In some embodiments, the composition of this general category also includes an amine compound, such as hydrazine, TEPA, or triethanolamine. In some embodiments, the aqueous composition contains an azo compound and an amine compound (for example, the aqueous composition contains azodicarbonamide and TEPA). In some embodiments, an azo compound-containing composition includes a hydrazide compound, such as carbohydrazide or p-toluenesulfonyl hydrazide. In some embodiments, the aqueous composition contains an azo compound and a hydrazide compound (for example, the aqueous composition contains azodicarbonamide and carbohydrazide). In some embodiments, the azo compound-containing composition includes a viscosifier, such as diutan or xanthan. In some embodiments, the azo compound containing composition includes a foaming surfactant, such as lauryl hydroxysultaine. In some embodiments, the azo-compound containing composition includes an oxidizing compound, such as, sodium or potassium persulfate hydrogen peroxide, sodium hypochlorite, calcium hypochlorite, or t-butyl hydrogen peroxide. In some embodiments, the azo compound containing composition includes an acid, such as hydrochloric acid or sulfuric acid. In some embodiments, the azo compound containing composition includes at least one optional additional ingredient, such as a buffering agent, an inorganic salt, an organic solvent, a chelating agent, a formate, or an particulate inorganic material.

Example Azo Compounds

In some embodiments, an azo compound has Formula (I):

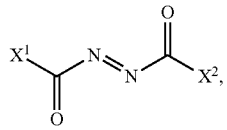

or a salt of the same, where:

$X^1$ and $X^2$ are each independently selected from $C_{1-6}$ alkyl, $C_{2-6}$ alkenyl, $C_{2-6}$ alkynyl, $OR^{a1}$, and $NR^{c1}R^{d1}$; and each $R^{a1}$, $R^{c1}$, and $R^{d1}$ is independently selected from H, $C_{1-6}$ alkyl, $C_{2-6}$ alkenyl, $C_{2-6}$ alkynyl, $C_{3-7}$ cycloalkyl, and $C_{6-10}$ aryl, where said $C_{1-6}$ alkyl is optionally substituted with $C_{6-10}$ aryl.

In some embodiments, $X^1$ is selected from $C_{1-6}$ alkyl, $C_{2-6}$ alkenyl, $OR^{a1}$, and $NR^{c1}R^{d1}$. In some embodiments, $X^1$ is selected from $C_{1-6}$ alkyl and $C_{2-6}$ alkenyl. In some embodiments, $X^1$ is selected from $OR^{a1}$ and $NR^{c1}R^{d1}$. In some embodiments, $X^1$ is $C_{1-6}$ alkyl. In some embodiments, $X^1$ is $C_{2-6}$ alkenyl. In some embodiments, $X^1$ is $OR^{a1}$. In some embodiments, $X^1$ is $NR^{c1}R^{d1}$.

In some embodiments, $X^2$ is selected from $C_{1-6}$ alkyl, $C_{2-6}$ alkenyl, $OR^{a1}$, and $NR^{c1}R^{d1}$. In some embodiments, $X^2$ is selected from $C_{1-6}$ alkyl and $C_{2-6}$ alkenyl. In some embodiments, $X^2$ is selected from $OR^{a1}$ and $NR^{c1}R^{d1}$. In some embodiments, $X^2$ is $C_{1-6}$ alkyl. In some embodiments, $X^2$ is $C_{2-6}$ alkenyl. In some embodiments, $X^2$ is $OR^{a1}$. In some embodiments, $X^2$ is $NR^{c1}R^{d1}$.

In some embodiments, $X^1$ and $X^2$ are each independently selected from $C_{1-6}$ alkyl and $C_{2-6}$ alkenyl. In some embodiments, $X^1$ and $X^2$ are each independently selected from $OR^{a1}$ and $NR^{c1}R^{d1}$. In some embodiments, $X^1$ is $C_{1-6}$ alkyl and $X^2$ is $C_{2-6}$ alkenyl. In some embodiments, $X^1$ is $C_{1-6}$ alkyl and $X^2$ is $OR^{a1}$. In some embodiments, $X^1$ is $C_{2-6}$ alkenyl and $X^2$ is $OR^{a1}$. In some embodiments, $X^1$ is $C_{1-6}$ alkyl and $X^2$ is $NR^{c1}R^{d1}$. In some embodiments, $X^1$ is $C_{1-6}$ alkyl and $X^2$ is $NR^{c1}R^{d1}$.

In some embodiments, $X^1$ and $X^2$ are each $C_{1-6}$ alkyl. In some embodiments, $X^1$ and $X^2$ are each $C_{2-6}$ alkenyl. In some embodiments, $X^1$ and $X^2$ are each $OR^{a1}$ and the compound of Formula (I) has Formula (Ia):

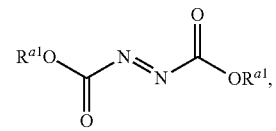

or a salt of the same.

In some embodiments, $X^1$ is $OR^{a1}$, $X^2$ is $NR^{c1}R^{d1}$ and the compound of Formula (I) has Formula (Ib):

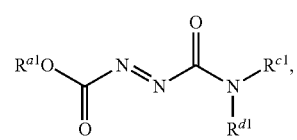

or a salt of the same.

In some embodiments, $X^1$ and $X^2$ are each $NR^{c1}R^{d1}$, and the compound of Formula (I) has Formula (Ic):

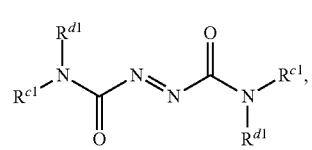

or a salt of the same.

In some embodiments, $R^{a1}$ is selected from H, $C_{1-6}$ alkyl, $C_{2-6}$ alkenyl, $C_{2-6}$ alkynyl, $C_{3-7}$ cycloalkyl, and $C_{6-10}$ aryl. In some embodiments, $R^{a1}$ is $C_{6-10}$ aryl-$C_{1-3}$ alkylene. In some embodiments, $R^{a1}$ is H. In some embodiments, $R^{a1}$ is $C_{1-6}$ alkyl. In some embodiments, $R^{a1}$ is $C_{2-6}$ alkenyl. In some embodiments, $R^{a1}$ is $C_{3-7}$ cycloalkyl. In some embodiments, $R^{a1}$ is $C_{6-10}$ aryl.

In some embodiments, $R^{c1}$ and $R^{d1}$ are independently selected from H, $C_{1-6}$ alkyl, and $C_{2-6}$ alkenyl. In some embodiments, $R^{c1}$ and $R^{d1}$ are independently selected from H and $C_{1-6}$ alkyl. In some embodiments, $R^{c1}$ and $R^{d1}$ are each H. In some embodiments, $R^{c1}$ and $R^{d1}$ are each $C_{1-6}$ alkyl. In some embodiments, $R^{c1}$ are each H and $R^{d1}$ is $C_{6-10}$ aryl-$C_{1-3}$ alkylene.

In some embodiments, $R^{a1}$, $R^{c1}$ and $R^{d1}$ are each H. In some embodiments, $R^{a1}$ and $R^{c1}$ are each H, and $R^{d1}$ is $C_{1-6}$ alkyl. In some embodiments, $R^{a1}$ is selected from $C_{1-6}$ alkyl, $C_{2-6}$ alkenyl, $C_{3-7}$ cycloalkyl, and $C_{6-10}$ aryl; $R^{c1}$ is H, and $R^{d1}$ is selected from H and $C_{1-6}$ alkyl. In some embodiments, each $R^{a1}$, $R^{c1}$ and $R^{d1}$ is independently selected from H and $C_{1-6}$ alkyl.

In some embodiments, an azo compound of Formula (I) is azodicarbonamide (also known as AZDC, carbamoyliminourea, azo(bis)formamide, and diazenedicarboxamide, CAS Registry No. 123-77-3) having the following structure:

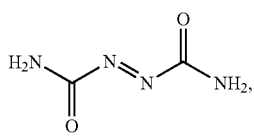

or a salt of the same.

In some embodiments, an azo compound of Formula (I) is azodicarboxylic acid (CAS Registry No. 4910-62-7) having the following structure:

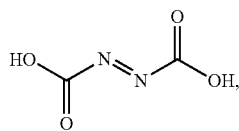

or a salt of the same.

In some embodiments, the compound of Formula (I) is diethyl diazenedicarboxylate (also known as DEAD, CAS Registry No. 1972-28-7) having the following structure:

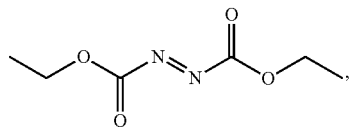

or a salt of the same.

In some embodiments, the compound of Formula (I) is diisopropyl azodicarboxylate (also known as DIAD, CAS Registry No. 2446-83-5) having the following structure:

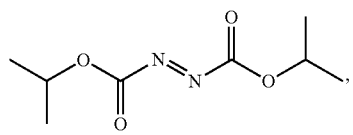

or a salt of the same.

In some embodiments, the compound of Formula (I) is selected from any one of the following compounds:

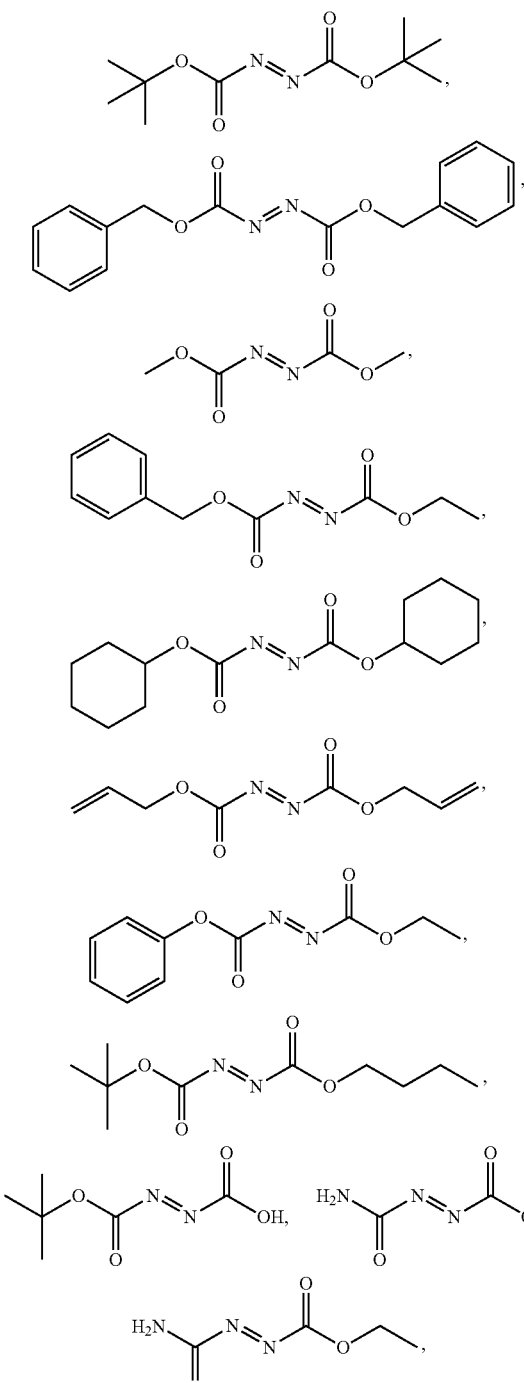

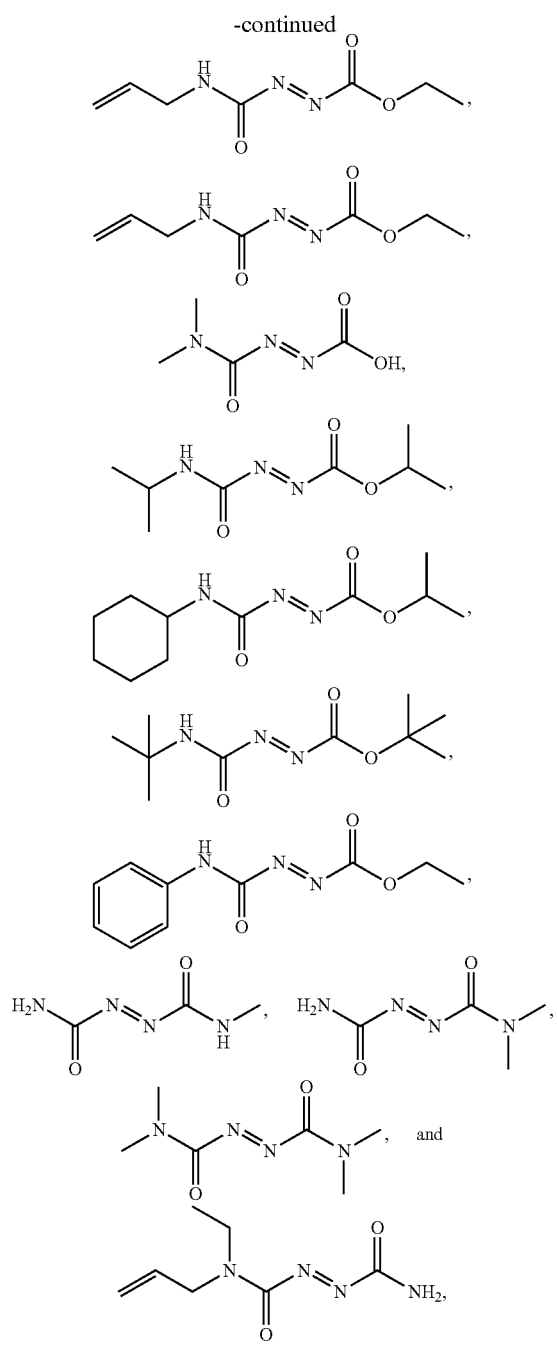

or a salt of the same.

In some embodiments, the composition contains from about 0.5 wt. % to about 25 wt. %, from about 1 wt. % to about 20 wt. %, from about 1 wt. % to about 10 wt. %, from about 2 wt. % to about 18 wt. %, or from about 3 wt. % to about 15 wt. % of the azo compound. In some embodiments, the aqueous composition contains about 0.5 wt. %, about 1 wt. %, about 2 wt. %, about 3 wt. %, about 3.5 wt. %, about 4 wt. %, about 4.5 wt. %, about 5 wt. %, about 7.5 wt. %, about 10 wt. %, about 15 wt. %, or about 20 wt. % of the azo compound.

In some embodiments, azo compound in the aqueous composition is the gas-generating chemical. That is, without being bound to any particular theory, it is believed that upon activation, azo compound decomposes to produce gas. Depending on the actual chemical structure of the azo compound, nitrogen gas, carbon monoxide, carbon dioxide, ammonia, lower alkyl amines, alkylene (for example, ethylene, propylene, or isobutene), or any combinations of the same, may be released upon decomposition of the azo compound.

For example, when the azo compound is azodicarbonamide (AZDC), the azo compound may decompose to produce a gaseous mixture is shown in Scheme 1.

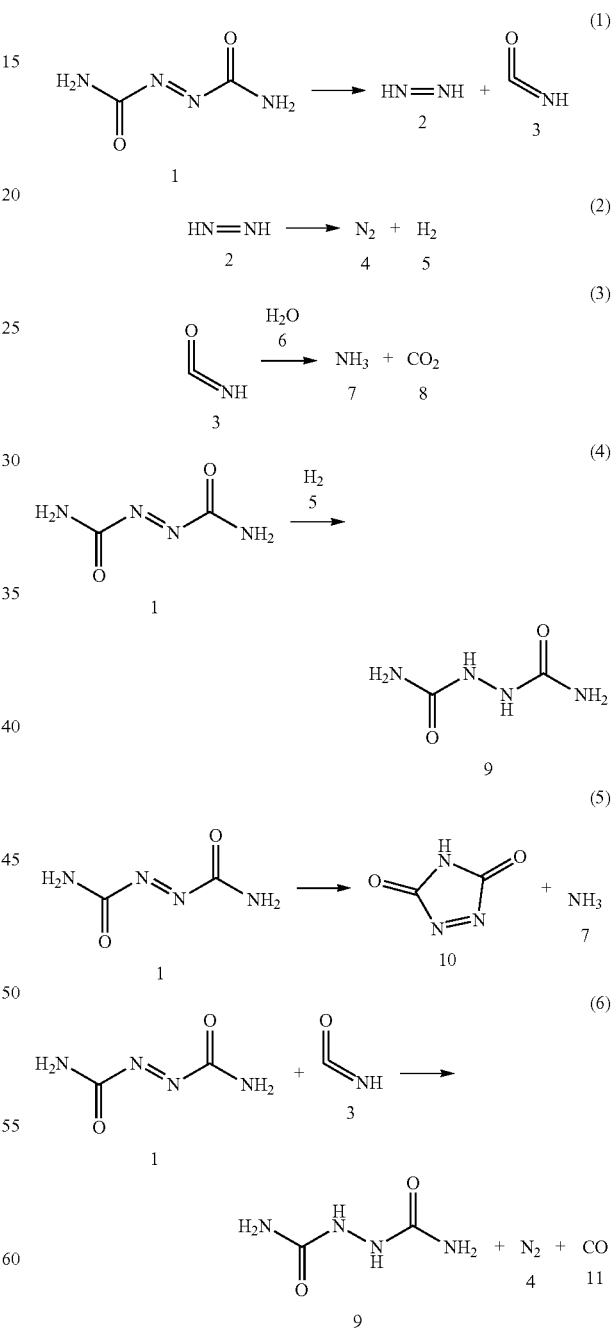

Referring to Scheme 1, when azodicarbonamide 1 is activated, for example, by heat, the compound 1 decomposes to yield diimide 2 and isocyanic acid 3, as shown in equation (1). As shown in equation (2), the diimide 2 further disproportionates to produce nitrogen gas 4 and hydrogen gas 5. As shown in equation (3), in an aqueous environment, isocyanic acid 3 is hydrolyzed to produce ammonia gas 7 and carbon dioxide 8. As shown in equation (4), the hydrogen gas that has been produced after disproportionation of diimide 2 may also reduce the unreacted azodicarbonamide 1, thus producing hydrazinodicarboxamide 9, which is no longer active and may not generate any gaseous compounds in the composition. Additionally, as shown in equation (5), azodicarbonamide 1 may undergo a cyclization reaction to form urazole 10 and ammonia gas 7. Finally, as shown in equation (6), two moles of isocyanic acid 3 may react with one mole of the starting material azodicarbonamide 1 to produce inactive hydrazinodicarboxamide 9, nitrogen gas 4, and also carbon monoxide 11. In sum, decomposition of azodicarbonamide (AZDC) yields nitrogen gas, hydrogen gas, ammonia gas, carbon dioxide gas, and carbon monoxide gas, and also produces some amount of inactive compound hydrazinodicarboxamide.

In another example, when the azo compound is azodicarboxylic acid, the azo compound may decompose to produce a gaseous mixture as shown in Scheme 2.

Scheme 2

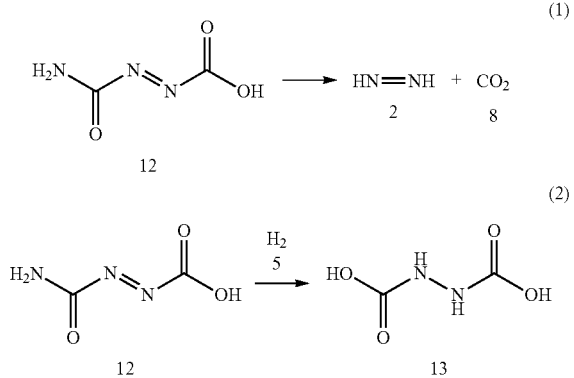

Referring to scheme 2, azodicarboxylic acid 12 may decompose to produce diimide 2 and carbon dioxide 8. (See equation 1). As shown in Scheme 1, the diimide 2 further disproportionates to produce nitrogen gas 4 and hydrogen gas 5. The hydrogen gas 5, in turn, reduces the starting material 12 to produce inactive hydrazinodicarboxamide 13 (as shown in equation 2), which can no longer decompose to produce gaseous compounds.

In yet another example, when the azo compound is diisopropyl hydrazine-1,2-dicarboxylate, the azo compound may decompose to produce a gaseous mixture as shown in Scheme 3.

Scheme 3

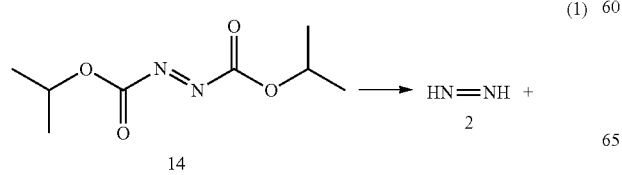

-continued

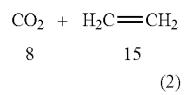

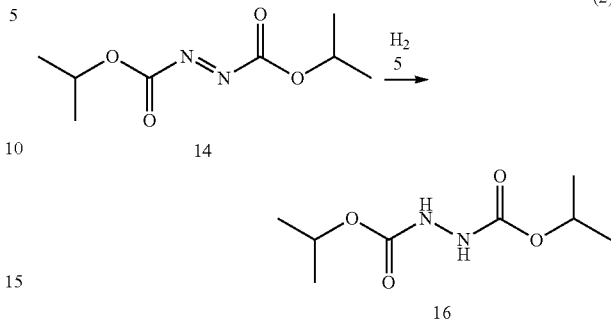

Referring to scheme 3, diisopropyl hydrazine-1,2-dicarboxylate 14 may decompose to produce diimide 2, carbon dioxide 8, and ethylene 15. (See equation 1). As shown in Scheme 1, the diimide 2 further disproportionates to produce nitrogen gas 4 and hydrogen gas 5. The hydrogen gas 5, in turn, reduces the starting material 14 to produce inactive diisopropyl hydrazine-1,2-dicarboxylate 16 (as shown in equation 2), which can no longer decompose to produce gaseous compounds.

In some embodiments, the decomposition of azo compound is activated by elevated temperature (for example, temperature in the wellbore greater than 100° C.), basic pH, presence of a catalyst compound (such as any of the amine compounds described later), or any combination of these activating factors. In some embodiments, decomposition of azo compound and gas release are activated by basic pH and presence of an amine activator compound in the wellbore. In some embodiments, decomposition of azo compound and gas release are activated by elevated and the presence of an amine activator compound temperature in the wellbore. In some embodiments, decomposition of azo compound and gas release are activated by basic pH and elevated temperature in the wellbore. In some embodiments, an azo compound decomposes at a temperature from about 80° C. to about 250° C., from about 100° C. to about 225° C., from about 120° C. to about 210° C., from about 125° C. to about 200° C., or from about 150° C. to about 200° C. In some embodiments, an azo compound decomposes at about 100° C., about 120° C., about 125° C., about 140° C., about 150° C., about 175° C., about 180° C., about 200° C., about 220° C., or about 250° C. In some embodiments, decomposition of the azo compound and release of gas is an endothermic process. In other embodiments, decomposition of the azo compound and release of gas is an exothermic process.

In some embodiments, any one of compounds of Formula (I) upon decomposition generates a reduced dicarboxyl derivative of hydrazine of Formula (V):

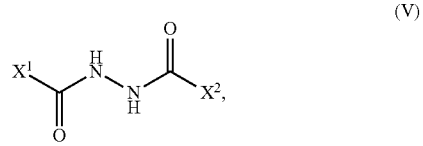

or salt of the same, where $X^1$ and $X^2$ are as described herein for Formula (I). Examples of compounds of Formula (V) include hydrazine-1,2-dicarboxamide 9 (Scheme 1), hydrazine-1,2-dicarboxylic acid 13 (Scheme 2), and diisopropyl hydrazine-1,2-dicarboxylate 16 (Scheme 3).

In some embodiments, when an oxidizing compound is present in the composition, the compound of Formula (V) may react with the oxidizing compound to produce the corresponding azo compound of Formula (I), for example, as shown in Scheme 4.

Scheme 4

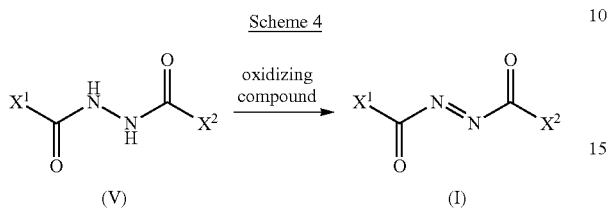

Referring to scheme 4, an oxidizing compound in its oxidized state reacts with the dicarboxyl hydrazine compound to generate a nitrogen-nitrogen double bond and hence to produce the azo compound of formula (I) and the reduced form of the oxidizing compound as a byproduct. That is, the compound of Formula (V) undergoes a dehydrogenation reaction upon contact with the oxidizer compound to reproduce an azo compound of Formula (I).

Example Oxidizing Compounds

In some embodiments, an aqueous gas-generating composition of the present disclosure includes an oxidizing compound. In some embodiments, the oxidizing compound is inorganic. Suitable examples of inorganic oxidizes include hydrogen peroxide, sodium hypochlorite, calcium hypochlorite, peroxysulfate, peroxycarbonate, peroxyborate, and peroxides of alkali and alkaline earth metals (for example, sodium peroxide, potassium peroxide, or calcium peroxide). In some embodiments, the oxidizing compound is organic. Suitable examples of organic oxidizing compounds include water soluble or water dispersible peracids, peroxides and hydroperoxides, such as peracetic acid, benzoyl peroxide and t-butyl hydrogen peroxide.

In some embodiments, oxidizing compound is selected from a peroxysulfate, a peroxycarbonate, or a peroxyborate of alkali and alkaline earth metals, a peroxide (for example, alkali metal peroxide, alkali earth metal peroxide, benzoyl peroxide or t-butyl hydrogen peroxide), a hypochlorite (for example, sodium hypochlorite or calcium hypochlorite), and an organic peracid (for example, peracetic acid).

Typically, an oxidizing compound is present in the aqueous composition in 1:1 molar ratio with the azo compound. In some embodiments, an oxidizing compound is present in the gas-generating composition in molar excess with respect to the azo compound. For example, the oxidizer compound may be present in about 10:1, about 8:1, about 5:1, about 3:1, about 2:1, or about 1.5:1 molar excess with respect to the azo compound.

In some embodiments, the composition contains from about 0.5 wt. % to about 25 wt. %, from about 1 wt. % to about 20 wt. %, from about 2 wt. % to about 18 wt. %, or from about 3 wt. % to about 15 wt. % of the oxidizing compound based on the weight of the composition. In some embodiments, the aqueous composition contains about 0.5 wt. %, about 1 wt. %, about 2 wt. %, about 3 wt. %, about 3.5 wt. %, about 4 wt. %, about 4.5 wt. %, about 5 wt. %, about 7.5 wt. %, about 10 wt. %, about 15 wt. %, or about 20 wt. % of the oxidizing compound based on the weight of the aqueous composition.

In some embodiments, addition of the oxidizer compound to the aqueous composition increases the amount of gaseous compounds produced upon activation of the gas-generating compound, for example, by converting the inactive reduced form of the gas-generating compound to the active form. An example of this process as applied to the azo compounds is shown in Scheme 4.

Example Amine Compounds

In some embodiments, an aqueous gas-generating composition of the present disclosure contains an amine compound. In some embodiments, the amine compound is a primary, secondary or tertiary amine of Formula (IVa):

(IVa)

or a salt of the same, where:

$R^{n1}$, $R^{n2}$ and $R^{n3}$ are independently selected from H, $C_{1-6}$ alkyl, $C_{2-6}$ alkenyl, $C_{2-6}$ alkynyl, $C_{3-7}$ cycloalkyl, 4-7 membered heterocycloalkyl, and $C_{6-10}$ aryl, each of which is optionally substituted with 1, 2, or 3 substituents independently selected from hydroxyl, $C_{1-6}$ alkoxy, amino, $C_{1-6}$ alkylamino, di($C_{1-6}$ alkyl)amino, carboxy, carbamyl, $C_{1-6}$ alkylcarbamyl, di($C_{1-6}$ alkyl)carbamyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylamino, and di($C_{1-6}$ alkyl)aminocarbonylamino; or any two $R^{n1}$ and $R^{n2}$, or any two $R^{n2}$ and $R^{n3}$, or any two $R^{n1}$ and $R^{n3}$ together with the N atom to which they are attached form a 4-7 membered heterocycloalkyl, which is optionally substituted with 1, 2, 3, 4, or 5 substituents independently selected from $C_{1-6}$ alkyl, $NH_2$—$C_{1-6}$ alkylene, OH—$C_{1-6}$ alkylene, hydroxyl, $C_{1-6}$ alkoxy, amino, $C_{1-6}$ alkylamino, di($C_{1-6}$ alkyl)amino, carboxy, carbamyl, $C_{1-6}$ alkylcarbamyl, di($C_{1-6}$ alkyl)carbamyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylamino, and di($C_{1-6}$ alkyl)aminocarbonylamino.

In some embodiments, $R^{n1}$, $R^{n2}$ and $R^{n3}$ are independently selected from H, $C_{1-6}$ alkyl, $C_{3-7}$ cycloalkyl, and 4-7 membered heterocycloalkyl, each of which is optionally substituted with 1, 2, or 3 substituents independently selected from hydroxyl, $C_{1-6}$ alkoxy, amino, $C_{1-6}$ alkylamino, di($C_{1-6}$ alkyl)amino, carboxy, and carbamyl.

In some embodiments, $R^{n1}$ is H, and $R^{n2}$ and $R^{n3}$ are independently selected from $C_{1-6}$ alkyl, $C_{3-7}$ cycloalkyl, and 4-7 membered heterocycloalkyl, each of which is optionally substituted with 1, 2, or 3 substituents independently selected from hydroxyl, $C_{1-6}$ alkoxy, amino, $C_{1-6}$ alkylamino, di($C_{1-6}$ alkyl)amino, carboxy, and carbamyl.

In some embodiments, $R^{n1}$, $R^{n2}$ and $R^{n3}$ are independently selected from H and $C_{1-6}$ alkyl, which is optionally substituted with 1, 2, or 3 substituents independently selected from hydroxyl, $C_{1-6}$ alkoxy, amino, $C_{1-6}$ alkylamino, di($C_{1-6}$ alkyl)amino, and carboxy.

In some embodiments, $R^{n1}$, $R^{n2}$ and $R^{n3}$ are independently $C_{1-6}$ alkyl, which is optionally substituted with 1, 2, or 3 substituents independently selected from hydroxyl, amino, and carboxy.

In some embodiments, any two $R^{n1}$ and $R^{n2}$, or any two $R^{n2}$ and $R^{n3}$, or any two $R^{n1}$ and $R^{n3}$ together with the N atom to which they are attached form a 4-7 membered heterocycloalkyl, which is optionally substituted with 1, 2, 3, 4, or 5 substituents independently selected from $C_{1-6}$ alkyl, $NH_2$—$C_{1-6}$ alkylene, OH—$C_{1-6}$ alkylene, hydroxyl, $C_{1-6}$ alkoxy, amino, $C_{1-6}$ alkylamino, di($C_{1-6}$ alkyl)amino, carboxy, and carbamyl.

In some embodiments, the compound of Formula (IVa) is triethanolamine (also known as tris(2-hydroxyethyl)amine, CAS Registry No. 102-71-6) having the following structure:

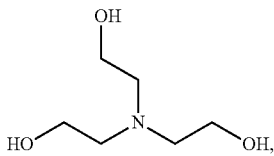

or a salt of the same.

In some embodiments, the compound of Formula (IVa) is selected from any one of the following compounds:

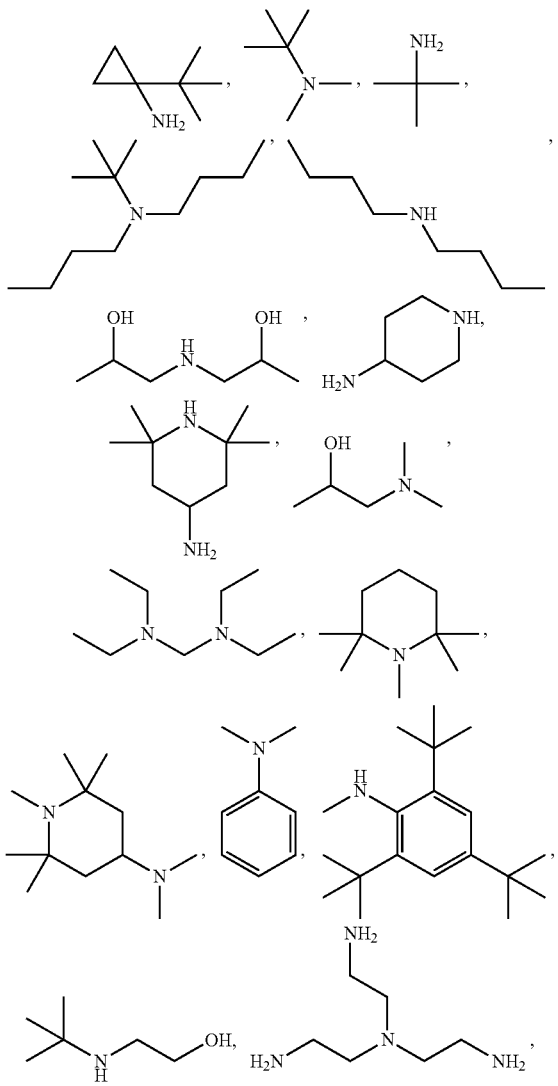

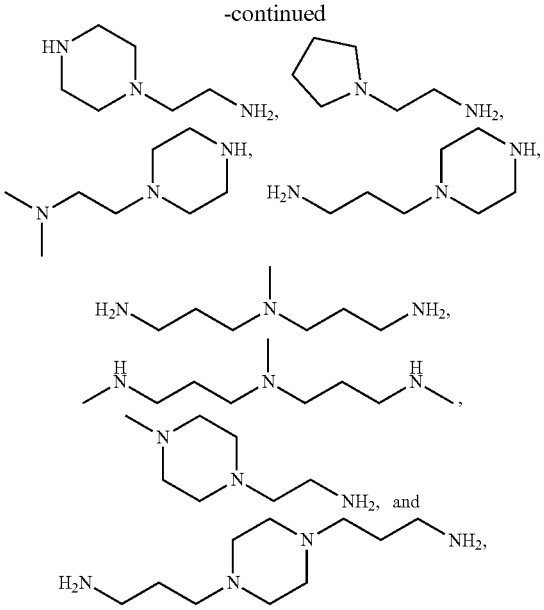

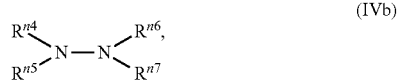

or a salt of the same.

In some embodiments, the amine compound is ammonia (for example, aqueous ammonia solution), ammonium hydrochloride, ammonium sulfate, ammonium hydrosulfate, ammonium carbamate, ammonium acetate, or ammonium oxalate.

In some embodiments, the amine compound is a hydrazine compound of Formula (IVb):

$$\begin{array}{c} R^{n4} \\ R^{n5} \end{array} N - N \begin{array}{c} R^{n6}, \\ R^{n7} \end{array} \tag{IVb}$$

or a salt of the same, where:

$R^{n4}$, $R^{n5}$, $R^{n6}$, and $R^{n7}$ are independently selected from H, $C_{1-6}$ alkyl, $C_{2-6}$ alkenyl, $C_{2-6}$ alkynyl, $C_{3-7}$ cycloalkyl, 4-7 membered heterocycloalkyl, and $C_{6-10}$ aryl, each of which is optionally substituted with 1, 2, or 3 substituents independently selected from hydroxyl, $C_{1-6}$ alkoxy, amino, $C_{1-6}$ alkylamino, di($C_{1-6}$ alkyl)amino, carboxy, carbamyl, $C_{1-6}$ alkylcarbamyl, di($C_{1-6}$ alkyl)carbamyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylamino, and di($C_{1-6}$ alkyl)aminocarbonylamino; or any two $R^{n4}$ and $R^{n5}$, or any two $R^{n6}$ and $R^{n7}$, together with the N atom to which they are attached form a 4-7 membered heterocycloalkyl, which is optionally substituted with 1, 2, 3, 4, or 5 substituents independently selected from $C_{1-6}$ alkyl, hydroxyl, $C_{1-6}$ alkoxy, amino, $C_{1-6}$ alkylamino, di($C_{1-6}$ alkyl)amino, carboxy, carbamyl, $C_{1-6}$ alkylcarbamyl, di($C_{1-6}$ alkyl)carbamyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylcamino, and di($C_{1-6}$ alkyl)aminocarbonylamino.

In some embodiments, $R^{n4}$, $R^{n5}$, $R^{n6}$, and $R^{n7}$ are independently selected from H, $C_{1-6}$ alkyl, $C_{3-7}$ cycloalkyl, and 4-7 membered heterocycloalkyl, each of which is optionally substituted with 1, 2, or 3 substituents independently selected from hydroxyl, $C_{1-6}$ alkoxy, amino, $C_{1-6}$ alkylamino, di($C_{1-6}$ alkyl)amino, carboxy, and carbamyl.

In some embodiments, $R^{n4}$ and $R^{n5}$ are each H, and $R^{n6}$ and $R^{n7}$ are independently selected from $C_{1-6}$ alkyl, $C_{3-7}$ cycloalkyl, and 4-7 membered heterocycloalkyl, each of which is optionally substituted with 1, 2, or 3 substituents independently selected from hydroxyl, $C_{1-6}$ alkoxy, amino, $C_{1-6}$ alkylamino, di($C_{1-6}$ alkyl)amino, carboxy, and carbamyl.

In some embodiments, $R^{n4}$, $R^{n5}$ and $R^{n6}$ are each H, and $R^{n7}$ is selected from $C_{1-6}$ alkyl, $C_{3-7}$ cycloalkyl, and 6-12 membered aryl, each of which is optionally substituted with 1, 2, or 3 substituents independently selected from $C_{1-6}$ alkyl, hydroxyl, $C_{1-6}$ alkoxy, amino, $C_{1-6}$ alkylamino, di($C_{1-6}$ alkyl)amino, carboxy, and carbamyl.

In some embodiments, $R^{n4}$, $R^{n5}$, $R^{n6}$, and $R^{n7}$ are independently selected from H and $C_{1-6}$ alkyl, which is optionally substituted with 1, 2, or 3 substituents independently selected from hydroxyl, $C_{1-6}$ alkoxy, amino, $C_{1-6}$ alkylamino, di($C_{1-6}$ alkyl)amino, and carboxy.

In some embodiments, $R^{n4}$, $R^{n5}$, $R^{n6}$, and $R^{n7}$ are each independently $C_{1-6}$ alkyl, which is optionally substituted with 1, 2, or 3 substituents independently selected from hydroxyl, amino, and carboxy.

In some embodiments, any two $R^{n4}$ and $R^{n5}$, or any two $R^{n6}$ and $R^{n7}$, together with the N atom to which they are attached form a 4-7 membered heterocycloalkyl, which is optionally substituted with 1, 2, 3, 4, or 5 substituents independently selected from $C_{1-6}$ alkyl, hydroxyl, $C_{1-6}$ alkoxy, amino, $C_{1-6}$ alkylamino, di($C_{1-6}$ alkyl)amino, carboxy, and carbamyl.

In some embodiments, a hydrazine compound of Formula (IVb) is selected from hydrazine, hydrazine monohydrobromide, hydrazine hydrate, hydrazine sulfate, hydrazine acetate, hydrazine dihydrochloride, hydrazine monohydrochloride, and hydrazine acetate.

In some embodiments, a hydrazine compound of Formula (IVb) is selected from any one of the following compounds:

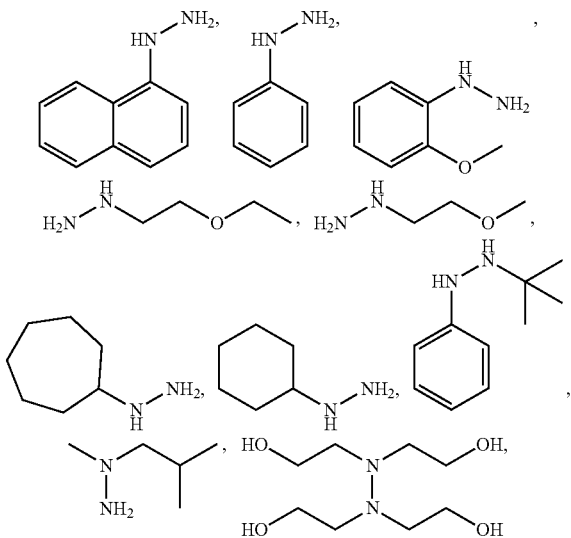

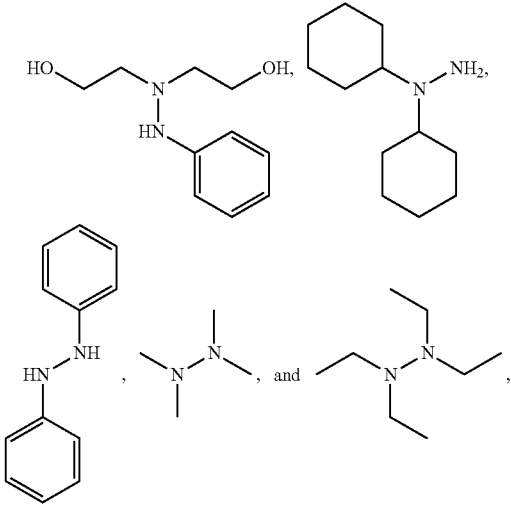

or salt of the same.

In some embodiments, the amine compound is an ethyleneimine compound of Formula (IVc):

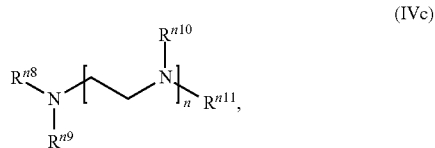

(IVc)

or a salt of the same, where: n is an integer from 1 to 10, $R^{n8}$, $R^{n9}$, $R^{n10}$, and $R^{n11}$ are independently selected from H, $C_{1-6}$ alkyl, $C_{2-6}$ alkenyl, $C_{2-6}$ alkynyl, $C_{3-7}$ cycloalkyl, 4-7 membered heterocycloalkyl, and $C_{6-10}$ aryl, each of which is optionally substituted with 1, 2, or 3 substituents independently selected from hydroxyl, $C_{1-6}$ alkoxy, $NH_2$—$C_{1-6}$ alkylene, OH—$C_{1-6}$ alkylene, amino, $C_{1-6}$ alkylamino, di($C_{1-6}$ alkyl)amino, carboxy, carbamyl, $C_{1-6}$ alkylcarbamyl, di($C_{1-6}$ alkyl)carbamyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylamino, and di($C_{1-6}$ alkyl)aminocarbonylamino; or any two $R^{n8}$ and $R^{n9}$, or any two $R^{n10}$ and $R^{n11}$, together with the N atom to which they are attached form a 4-7 membered heterocycloalkyl, which is optionally substituted with 1, 2, 3, 4, or 5 substituents independently selected from $C_{1-6}$ alkyl, $NH_2$—$C_{1-6}$ alkylene, OH—$C_{1-6}$ alkylene, hydroxyl, $C_{1-6}$ alkoxy, amino, $C_{1-6}$ alkylamino, di($C_{1-6}$ alkyl)amino, carboxy, carbamyl, $C_{1-6}$ alkylcarbamyl, di($C_{1-6}$ alkyl)carbamyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylcamino, and di($C_{1-6}$ alkyl)aminocarbonylamino.

In some embodiments, $R^{n5}$, $R^{n9}$, $R^{n10}$, and $R^{n11}$ are independently selected from H, $C_{1-6}$ alkyl, $C_{3-7}$ cycloalkyl, and 4-7 membered heterocycloalkyl, each of which is optionally substituted with 1, 2, or 3 substituents independently selected from hydroxyl, $C_{1-6}$ alkoxy, amino, $C_{1-6}$ alkylamino, di($C_{1-6}$ alkyl)amino, carboxy, and carbamyl.

In some embodiments, n is an integer from 1 to 8, and $R''^5$, $R''^9$, $R''^{10}$ and $R''^{11}$ are independently selected from H and $C_{1-6}$ alkyl, which is optionally substituted with 1, 2, or 3 substituents independently selected from amino, $C_{1-6}$ alkylamino, di($C_{1-6}$ alkyl)amino, carboxy, and carbamyl.

In some embodiments, n is an integer from 1 to 8, and $R''^5$, $R''^9$, $R''^{10}$ and $R''^{11}$ are each H. In some embodiments, $R''^5$, $R''^9$, $R''^{10}$, and $R''^{11}$ are each independently $C_{1-6}$ alkyl, which is optionally substituted with 1, 2, or 3 substituents independently selected from amino and carboxy.

In some embodiments, any two $R''^8$ and $R''^9$, or any two $R''^{10}$ and $R''^1$, together with the N atom to which they are attached form a 4-7 membered heterocycloalkyl, which is optionally substituted with 1, 2, 3, 4, or 5 substituents independently selected from $C_{1-6}$ alkyl, $NH_2$—$C_{1-6}$ alkylene, OH—$C_{1-6}$ alkylene, hydroxyl, $C_{1-6}$ alkoxy, amino, $C_{1-6}$ alkylamino, di($C_{1-6}$ alkyl)amino, carboxy, and carbamyl.

In some embodiments, the ethyleneimine compound of Formula (IVc) is selected from any one of the following compounds:

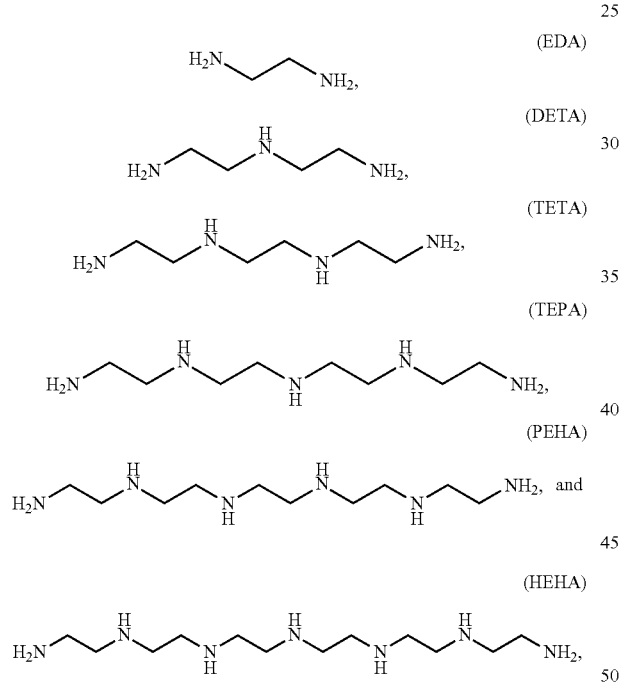

or a salt of the same.

In some embodiments, the gas-generating composition includes any combination of EDA, DETA, TETA, TEPA, PEHA and HEHA. For example, the gas-generating composition includes TETA and TEPA (for example, in equal amounts by weight). In another example, the gas generating composition includes TEPA, DETA, and TETA (for example, in equal amounts by weight).

In some embodiments, the amine compound is ethyleneimine compound selected from ethylene diamine (EDA), tetraethylene pentamine (TEPA), diethyletriamine (DETA), and polyethyleneimine, or a salt of the same.

In some embodiments, the amine compound is EDTA having the following structure:

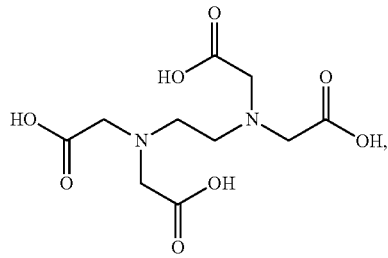 [SMILES: O=C(O)CN(CCN(CC(=O)O)CC(=O)O)CC(=O)O]

or a salt of the same.

In some embodiments, the amine compound is selected from any one of the following compounds:

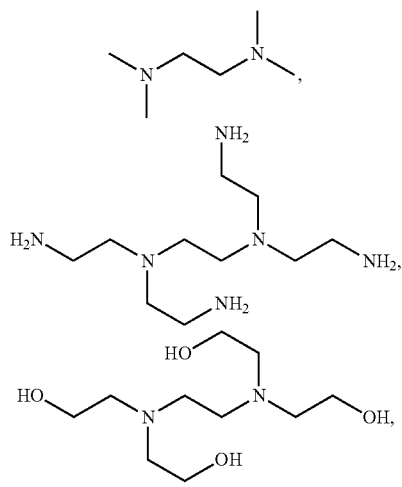

or a salt of the same.

In some embodiments, the amine compound is a polyethyleneimine, or a salt of the same. In some embodiments, the polyethyleneimine is linear. In other embodiments, the polyethyleneimine is branched (for example, CAS Reg. Nos. 9002-98-6, 25987-06-8). For example, a polyethyleneimine can have from 2 to 100 termini (for example, 2 to 80, 2 to 75, 2 to 60, 2 to 50, 2 to 40, 2 to 35, 2 to 25, 2 to 10, 2 to 5, 4 to 20, 5 to 25, 10 to 50, 25 to 75, 3 to 6, 5 to 15 termini). In some embodiments, a polyethyleneimine can have from 2 to 5, 4 to 6, 5 to 6, or 3 to 6 termini. In some embodiments, branched polyethyleneimine is V-shaped or T-shaped, depending on the method by which polyethyleneimine has been synthesized. In some embodiments, the polyethyleneimine has both linear and branched fragments. In some embodiments, the polyethyleneimine is alkylated (for example, methylated or ethylated). In some embodiments, the polyethyleneimine is PEGylated (for example reacted with ethylene oxide to form PEG chains having molecular weight between about 1,000 Da and about 100,000 Da).

In some embodiments, polyethyleneimine has average molecular weight between about 0.1 kDa to about 500 kDa. For example, molecular weight of polyethyleneimine may be between about 500 Da and about 100,000 Da. Polyethyleneimine described herein can have a molecular weight of about 100,000 Da, 95,000 Da, 90,000 Da, 85,000 Da, 80,000 Da, 75,000 Da, 70,000 Da, 65,000 Da, 60,000 Da, 55,000 Da, 50,000 Da, 45,000 Da, 40,000 Da, 35,000 Da, 30,000 Da, 25,000 Da, 20,000 Da, 15,000 Da, 10,000 Da, 9,000 Da, 8,000 Da, 7,000 Da, 6,000 Da, 5,000 Da, 4,000 Da, 3,000

Da, 2,000 Da, 1,000 Da, 900 Da, 800 Da, 700 Da, 600 Da, or 500 Da. In some embodiments, the molecular weight of polyethyleneimine is between about 500 Da and about 50,000 Da. In some embodiments, molecular weight of polyethyleneimine is between about 500 Da and about 40,000 Da. In some embodiments, molecular weight of polyethyleneimine is between about 1,000 Da and about 40,000 Da. In some embodiments, molecular weight of the polyethyleneimine is between about 5,000 Da and about 40,000 Da. In some embodiments, molecular weight of polyethyleneimine is between about 10,000 Da and about 40,000 Da.

An amine compound may catalyze the gas-generating decomposition reaction of an azo compound. Without being bound to any particular theory, it is believed that an amine compound may non-covalently bind to a carbonyl group of the azo compound, and thereby decrease the activation energy of the radical decomposition reaction the azo compound. That is, an amine compound serves a catalyst and induces decomposition of the azo compound and production of the diimide compound, which, it turn, further decomposes to yield nitrogen gas and hydrogen gas. Examples of non-covalent interactions of amine compounds and azo compounds include hydrogen bonds, Van-der-Waals forces, electrostatic attractions, and hydrophobic interactions. In some embodiments, an amine compound also catalyzes the decomposition reaction of the diimide compound and gas generation. In some embodiments, addition of an amine compound to the azo compound-containing composition decreases the decomposition temperature of the azo compound by a factor of 0.5 in terms of Celsius. That is, if an azo compound decomposes to produce gas at about 200° C. in the absence of an amine, then in the presence of an amine the azo compound decomposes at about 100° C. In some embodiments, addition of an amine decreases the decomposition temperature of the azo compound by a factor of about 0.6, about 0.7, about 0.8, about 0.9, or about 0.95 in terms of Celsius.

Typically, an amine compound is present in the aqueous composition in 1:1 molar ratio with the azo compound. In some embodiments, an amine compound is present in the gas-generating composition in molar excess with respect to the azo compound. For example, the amine compound may be present in about 10:1, about 8:1, about 5:1, about 3:1, about 2:1, or about 3:2 molar excess with respect to the azo compound. In some embodiments, the composition contains from about 0.5 wt. % to about 25 wt. %, from about 1 wt. % to about 20 wt. %, from about 1 wt. % to about 10 wt. %, from about 2 wt. % to about 18 wt. %, or from about 3 wt. % to about 15 wt. % of the amine compound based on the weight of the composition. In some embodiments, the aqueous composition contains about 0.5 wt. %, about 1 wt. %, about 2 wt. %, about 3 wt. %, about 3.5 wt. %, about 4 wt. %, about 4.5 wt. %, about 5 wt. %, about 7.5 wt. %, about 10 wt. %, about 15 wt. %, or about 20 wt. % of the amine compound based on the weight of the aqueous composition.

In some embodiments, an azo compound-containing composition includes a hydrazide compound. In such embodiments, the hydrazide compound may be a gas-generating compound, or an amine activator compound. For example, if an oxidizer is present in the aqueous composition, the hydrazide compound can be converted to the corresponding azo compound, which, in turn, may decompose to produce additional amount of gaseous compounds. In another example, whether or not an oxidizer is present in the composition, the hydrazide compound catalyzes the decomposition reaction of the azo compound. In some embodiments, hydrazide has an ambivalent functionality that is both gas-generating and as an amine activator. In some embodiments, a hydrazide compound that is present in the azo compound containing composition is selected from carbohydrazide and p-toluenesulfonyl hydrazide. In some embodiments, a hydrazide compound that is present in the azo compound containing composition is carbohydrazide. In these embodiments, carbohydrazide may be present in the composition in about 1:1 molar ratio with the azo compound. In some embodiments, the composition contains carbohydrazide in an amount from about 1 wt. % to about 20 wt. %, from about 1 wt. % to about 15 wt. %, or from about 1 wt. % to about 10 wt. %.

In some embodiments, the composition contains azodicarbonamide in an amount from about 1 wt. % to about 10 wt. %, and carbohydrazide in an amount from about 1 wt. % to about 10 wt. %. In some aspects of these embodiments, the composition contains a viscosifier in an amount from about 0.1 wt. % to about 1 wt. % based on the weight of the composition. In some aspects of these embodiments, the composition contains a foaming surfactant and the active content of the foaming surfactant may be present in an amount from about 1 wt. % to about 35 wt. % based on the weight of the aqueous composition. In yet other aspects of these embodiments, the composition contains an acid selected from hydrochloric acid and acetic acid. In yet other aspects of these embodiments, pH composition of the composition is less than about 5, less than about 4, less than about 3, less than about 2, or less than about 1. In yet other aspects of these embodiments, the composition is stable and does not generate any appreciable amount of gaseous compounds for a period of time selected from 1 hour, 5 hours, 12 hours, 24 hours, 2 days, 5 days, a week, or several weeks.

Examples of Viscosifiers

In some embodiments, an aqueous gas-generating composition of the present disclosure contains a viscosifier. In some embodiments, a viscosifier is a clay, a surfactant, a synthetic polymer, or a biopolymer. In some embodiments, the viscosifier is a bentonite, laponite, attapulgite, sepiolite, phyllosilicate, silica, or an organophilic clay. In some embodiments, the viscosifier is a water-soluble polyacrylate, a polyurethane, a polyether, a polymethacrylate, an acrylamide based polymer, sulfonated polystyrene (SPS), polyamine, polyamide, polyglycol, polyvinylacetate or polydiallyldimethylammonium chloride (polyDADMAC). In some embodiments, the viscosifier is a biobased polymer selected from starch, crosslinked starch, or cellulose (including its derivatives). In some embodiments, the viscosifier is an alkylated cellulose or a hydroxyalkylated cellulose, such as methylcellulose, ethylcellulose, hydroxyethyl cellulose, hydroxypropyl methylcellulose, or vinylphosphonate grafted hydroxyethylcellulose. The viscosifier can include a substituted or unsubstituted polysaccharide selected from diutan, xanthan, and xylinan. In some embodiments, the viscosifier is diutan. In some embodiments, the viscosifier is xanthan. In some embodiments, the polymer is a vinyl phosphonated hydroxyethyl cellulose.

Viscosifier gives the aqueous gas-generating composition its basic rheological properties, modulates the viscosity of the composition and provides shear-rate viscosity and weight-material suspension. In addition, some of the gas-generating compounds described herein (for example, azo compounds) are sparingly water-soluble, and precipitate quickly after mixing with water. Addition of the viscosifier to the composition suspends the gas-generating compound in water and allows to store the composition for prolonged periods of time without settling.

In some embodiments, the composition contains from about 0.1 wt. % to about 10 wt. %, from about 0.2 wt. % to about 9 wt. %, from about 0.3 wt. % to about 8 wt. %, or from about 0.5 wt. % to about 5 wt. % of the viscosifier based on the weight the aqueous composition. In some embodiments, the aqueous composition contains about 0.1 wt. %, about 0.2 wt. %, about 0.3 wt. %, about 0.5 wt. %, about 0.6 wt. %, about 1 wt. %, about 1.5 wt. %, about 2 wt. %, about 2.5 wt. %, about 3 wt. %, about 3.5 wt. %, or about 5 wt. % of the viscosifier.

In some embodiments, viscosity of the aqueous composition is from about 1 cP to about 1000 cP, from about 5 cP to about 500 cP, from about 10 cP to about 300 cP, or from about 20 cP to about 200 cP. In some embodiments, viscosity of the composition is from about 5 cP to about 500 cP.

In some embodiments, the aqueous composition is a clear solution. In some embodiments, the aqueous composition is a suspension. In these embodiments, the suspension may contain particles of a solid material, for example, azodicarbonamide, with an average diameter from about 10 nm to about 100 μm, or from about 1 m to about 10 m (for example, about 1 m, about 2 μm, about 3 m, about 5 m, or about 10 μm). In some embodiments, the solid material in the suspension does not settle (precipitate) for a prolonged period of time (for example, about 1 hour, about 5 hours, about 12 hours, about 24 hours, about 48 hours, about 2 days, about 5 days, or about 1 week or longer).

Examples of Foaming or Foam Stabilizing Surfactants

In some embodiments, an aqueous gas-generating composition of the present disclosure includes a water soluble foaming surfactant. As used herein, the term "foaming surfactant" includes foam stabilizing surfactants that are soluble in water.

In some embodiments, foaming surfactant is negatively charged (for example, anionic surfactant). In other embodiments, foaming surfactant is positively charged (for example, cationic surfactant). In some embodiments, foaming surfactant is neutral. In some aspects of these embodiments, foaming surfactant is zwitterionic (having a positive and a negative electrical charge so that the net charge of the entire molecule of the surfactant is zero). Suitable foaming surfactants include polymeric surfactants, block copolymer surfactants, di-block polymer surfactants, hydrophobically modified hydrophilic polymer surfactants, fluoro-surfactants, and surfactants containing a non-ionic spacer-arm central extension and an ionic or nonionic polar group. In some examples, the non-ionic spacer-arm central extension can be the result of at least one of polypropoxylation (PPGylation) and polyethoxylation (PEGylation).

Suitable examples of non-ionic surfactants include polyoxyethylene alkyl ethers, polyoxyethylene alkylphenol ethers, polyoxyethylene lauryl ethers, polyoxyethylene sorbitan monooleates, polyoxyethylene alkyl esters, polyoxyethylene sorbitan alkyl esters, ethoxylated trimethylnonanols, and polyoxyalkylene glycol modified polysiloxane surfactants. Other suitable examples of non-ionic surfactants include PEGylated long chain fatty alcohols or fatty acids such as a $C_{12-16}$ alcohol, PEGylated alkyl amine or an amide, co-polymerization products of ethylene oxide and propylene oxide, fatty esters of glycerol, sucrose, or sorbitol, alkylated fatty acid amides, fatty amine oxides, polyoxyalkylene alkyl ethers such as polyethylene glycol long chain alkyl ether, polyoxyalkylene sorbitan ethers, polyoxyalkylene alkoxylate esters, polyoxyalkylene alkylphenol ethers, alkylated polysaccharides, and polyvinylmethylether. In certain embodiments, the non-ionic surfactant is a polyoxyethylene fatty alcohol or mixture of polyoxyethylene fatty alcohols.

Suitable examples of anionic surfactants include $C_{8-30}$ alkyl sulfates (for example, lauryl sulfate), $C_{10-30}$ alkyl acrylates, alkylbenzenesulfonic acids (for example, hexylbenzenesulfonic acid, octylbenzenesulfonic acid, decylbenzenesulfonic acid, dodecylbenzenesulfonic acid, cetylbenzenesulfonic acid or myristylbenzene sulfonic acid), sulfate esters of monoalkyl polyoxyethylene ethers, alkylnapthylsulfonic acid; sodium lauryl sulfate and its salts, sulfonated glyceryl esters of fatty acids such as sulfonated monoglycerides of coconut oil acids, sodium octahydroanthracene sulfonate. For any of the anionic surfactant described herein, the counterion can be any suitable counterion, such as $H^+$, $Na^+$, $K^+$, $Li^+$, $Zn^{2+}$, $NH^{4+}$, $Ca^{2+}$, $Mg^{2+}$, $Zn^{2+}$, or $Al^{3+}$.

Suitable cationic surfactants can include at least one of an arginine methyl ester, an alkanolamine, an alkylenediamide, an amine oxide, an alkylamine oxide, an ethoxylated amide, an ethoxylated fatty amine, an ethoxylated alkyl amine, an alkyl betaine, an alkylamidobetaine, and a surfactant containing a quaternary ammonium group. Suitable examples of cationic surfactants include quaternary ammonium hydroxides (for example, octyl trimethyl ammonium hydroxide, dodecyl trimethyl ammonium hydroxide, hexadecyl trimethyl ammonium hydroxide, octyl dimethyl benzyl ammonium hydroxide, decyl dimethyl benzyl ammonium hydroxide, didodecyl dimethyl ammonium hydroxide, dioctadecyl dimethyl ammonium hydroxide, tallow trimethyl ammonium hydroxide or coco trimethyl ammonium hydroxide), fatty amines, fatty acid amides, basic pyridinium compounds, and quaternary ammonium bases of benzimidazolines, polyethoxylated amines, and polypropoxylated amines.

Some examples of foaming surfactants include sorbitan monooleate, polyglycol-modified trimethsilylated silicate, cetyltrimethylammonium chloride, an ethoxylated nonyl phenol phosphate ester, a $C_{12-22}$ alkyl phosphonate, a sulfonate methyl ester, a hydrolyzed keratin, a polyoxyethylene sorbitan monopalmitate, a polyoxyethylene sorbitan monostearate, a polyoxyethylene sorbitan monooleate, a linear alcohol alkoxylate, an alkyl ether sulfate, a linear nonyl-phenol, polyethylene glycol, an ethoxylated castor oil, dipalmitoyl-phosphatidylcholine, sodium 4-(heptylnonyl) benzenesulfonate, polyoxyethylene nonyl phenyl ether, sodium dioctyl sulfosuccinate, tetraethyleneglycoldodecylether, sodium octylbenzenesulfonate, sodium hexadecyl sulfate, sodium laureth sulfate, decylamine oxide, dodecyl betaine, dodecylamine oxide, N,N,N-trimethyl-1-octadecaammonium chloride, xylene sulfonate, sodium dodecyl sulfate, cetyltrimethylammonium bromide, cocoamidopropyl betaine, cocoamidopropyl dimethylamine oxide.

Example foaming surfactants also include $C_{5-50}$ hydrocarbylsulfates, $C_{5-50}$ hydrocarbylsulfate $C_{1-20}$ hydrocarbyl esters, where the $C_{1-20}$ hydrocarbyl is $C_{1-20}$ alkyl or $C_{2-20}$ alkenyl, $C_{5-20}$ alkylsulfate, a $C_{5-20}$ alkylsulfate $C_{1-20}$ alkyl esters, and $C_{5-20}$ alkylbisulfates.

In some embodiments, the foaming surfactant is a $C_{1-10}$ hydrocarbylamido $C_{1-5}$ alkylbetaine (for example, lauramidopropyl betaine). In some embodiments, the foaming surfactant is a $C_{1-10}$ hydrocarbylamido $C_{1-5}$ alkyldimethylamine oxide (for example, lauramidopropyl dimethylamine oxide).

In some embodiments, the foaming surfactant contains a hydroxy sulfobetaine group (also known as hydroxysultaine group). In some embodiments, the foaming surfactant is $C_{5-25}$ alkyl or $C_{5-25}$ alkenyl amidopropyl hydroxysultaine (for example, lauramidopropyl hydroxysultaine, cocamidopropyl hydroxysultaine, oleamidopropyl hydroxysultaine, tallowamidopropyl hydroxysultaine, or erucamidopropyl hydroxysultaine). In some embodiments, the foaming surfactant is $C_{8-16}$ alkyl hydroxy sulfobetaine or $C_{8-16}$ alkenyl hydroxy sulfobetaine. Suitable examples of these surfactants include didodecylmethyl hydroxyl sulfobetaine, lauryl hydroxysultaine, and octadecyl hydroxy sulfobetaine.

In some embodiment, the foaming surfactant is advantageously insensitive to the storing conditions of the gas-generating fluid and does not lose its properties due to the presence of salts in the fluid and to temperature of the fluid. In some embodiments, the foaming surfactant is resistant to degradation by oxidizing agents such as sodium hypochlorite.

Foaming surfactant facilitates formation of foam in the composition when the gas-generating compound is activated and produces gas (for example, $N_2$). A foaming surfactant reduces surface tension of water in the composition and promotes formation of the foam bubbles filled with the gas that is being generated. Without being bound to a particular theory, it is believed that formation of foam bubbles enhances variable density and compressibility of the fluid to which a gas-generating composition of the present disclosure is added and in which the gas is generated.

In some embodiments, the aqueous composition contains from about 1 wt. % to about 50 wt. %, from about 1 wt. % to about 40 wt. %, from about 1 wt. % to about 30 wt. %, from about 1 wt. % to about 25 wt. %, from about 1 wt. % to about 20 wt. %, from about 1 wt. % to about 15 wt. %, from about 2 wt. % to about 20 wt. %, from about 3 wt. % to about 20 wt. %, from about 4 wt. % to about 15 wt. %, or from about 5 wt. % to about 15 wt. % based on the weight of the aqueous composition. In some embodiments, the aqueous composition contains about 1 wt. %, about 2 wt. %, about 3 wt. %, about 4 wt. %, about 5 wt. %, about 10 wt. %, or about 15 wt. %.

In some embodiments, density of the composition is in the range of about 70 pounds per cubic foot (pcf) to about 150 pcf, about 20 pcf to about 250 pcf, or about 50 pcf to about 150 pcf. For example, the density of the composition is about 20 pcf, about 30 pcf, about 40 pcf, about 50 pcf, about 70 pcf, about 85 pcf, about 100 pcf, about 120 pcf, about 150 pcf, or about 200 pcf.

Examples of Acids

In some embodiments, an aqueous gas-generating composition contains an acid. In some embodiments, the acid is inorganic (mineral). Suitable examples of mineral acids include hydrochloric acid, sulfuric acid, nitric acid, boric acid, perchloric acid, and phosphoric acid. In some embodiments, the acid is organic. Suitable examples of organic acids include p-toluenesulfonic acid, formic acid, methanesulfonic acid, trifluoromethanesulfonic acid, trichloroacetic acid, trifluoroacetic acid, oxalic acid, carbonic acid, citric acid, benzoic acid and acetic acid. In some embodiments, the acid is hydrochloric acid. In some embodiments, the acid is sulfuric acid.

An acid may be present in the gas-generating composition to decrease pH of the composition. For example, pH or the composition containing azo compound, hydrazide compound, or semicarbazide compound, and optionally an amine compound or any other ingredient described here, may be basic (for example, pH of about 7.5, about 8, about 9, about 10, about 11, or about 12). At basic pH, gas-generating compound may be prematurely activated to produce gas. Hence, an acid may be added to the composition such that the resultant pH of the composition is acidic (for example, about 1, about 2, about 3, about 4, about 5). Typically, at acidic pH any gas-generating compound or the activator for gas generator in the composition is deactivated and the composition may be stored for a prolonged period of time without generating any gas (for example, 24 hours, 48 hours, 3 days, 5 days, or several weeks).

In some embodiments, pH of the aqueous composition is from about 0.1 to about 5, from about 0.1 to about 4, from about 0.2 to about 5, from about 0.5 to about 2, from about 1 to about 6, from about 1 to about 5, from about 1 to about 4, from about 2 to about 6, from about 2 to about 5, or from about 2 to about 4.

Examples of Additional Ingredients

In some embodiments, an aqueous gas-generating composition of the present application also contains at least one additional component. It is understood by one skilled in the art that an additive may be classified under more than one category. For example, sodium hydrogen phosphate may be considered as salt of a weak acid, namely phosphoric acid and a strong base, namely sodium hydroxide. It is also a buffer, because it has both acid and base components that can function as a buffering agent. The same compound can also function as a calcium precipitating agent, since calcium phosphate that is formed in the reaction between calcium hydroxide or calcium silicate both, of which are components of set cement and sodium hydrogen phosphate, is insoluble in water. Similarly, citric acid and an organic base such as ethanolamine or an inorganic base such as sodium hydroxide or sodium phosphate forms a buffer system that contains partially neutralized citric acid. The resulting citrate salt is a calcium chelating agent, as well as calcium precipitating agent while functioning as a component of the buffer system.

In some embodiments, the aqueous composition includes an inorganic salt. The salt can be about 1% to about 10% by weight of the composition. The salt can be selected from NaCl, NaBr, KCl, KBr, $NaHCO_3$, $Na_2CO_3$, $CaCl_2$, $MgCl_2$, $NaNO_3$, $KNO_3$, $NaC_2H_3O_2$, $KC_2H_3O_2$, $NaCHO_2$, $KCHO_2$, or any combinations of the same. For example, the salt can be selected from the group consisting of NaCl, KCl, and combinations of the same.

The aqueous composition may include a formate salt. Suitable examples of formates include at least one alkali metal formate, such as sodium formate or potassium formate. Other suitable formates may also be included. In some embodiments, the aqueous composition contains at least two formates. An amount of the formate, or a combination of the formates, in the aqueous composition may range from about 1 wt. % to about 20 wt. %, about 5 wt. % to about 15 wt. %, or about 10 wt. % to about 15 wt. %. For example, the slurry may contain about 1 wt. %, about 10 wt. %, about 15 wt. %, or about 20 wt. % of a formate or combination of formates.

An amount of an optional additional component in the slurry, such as an inorganic salt, a formate salt, a buffering agent or a chelating agent, an ultra-fine particulate inorganic material or any combination of the same, may vary from about 0.1 wt. % to about 30 wt. %, or from about 0.5 wt. % to about 20 wt. % based on the weight of the aqueous composition. The drill-in slurry may also include an ash, such as a soda ash, and a bicarbonate, such as sodium bicarbonate.

Hydrazide or Semicarbazide Compound Containing Compositions of Category (2)

In general, a hydrazide or semicarbazide compound-containing composition includes a hydrazide compound, such as p-toluenesulfonyl hydrazide, or a semicarbazide compound, such as p-toluenesulfonyl semicarbazide, either of which may be dissolved or dispersed in an aqueous solvent. In some embodiments, the composition includes a hydrazide compound as the only gas-generating ingredient in the aqueous composition. In some embodiments, the composition includes a semicarbazide compound as the only gas-generating ingredient in the aqueous composition. In some embodiments, the composition contains a hydrazide compound and a semicarbazide compound. In some aspects of these embodiments, the hydrazide and the semicarbazide compounds are present in the composition in equal amounts by weight. In other aspects of these embodiments, the weight ratio of hydrazide compound to semicarbazide compound is from about 1:10 to about 10:1, from about 1:5 to about 5:1, or from about 1:2 to about 2:1. For example, the weight ratio of hydrazide compound to semicarbazide compound in the composition is about 5:1, about 4:1, about 3:1, about 2:1, about 1:1, about 1:2, about 1:3, about 1:4, or about 1:5.

In some embodiments, the composition of this general category also includes an amine compound, such as hydrazine, TEPA, or triethanolamine, a viscosifier, such as diutan or xanthan, a foaming surfactant, such as lauryl hydroxysultaine, an oxidizing compound, such as hydrogen peroxide, sodium hypochlorite, calcium hypochlorite, or t-butyl hydrogen peroxide, an acid, such as hydrochloric acid or sulfuric acid, at least one optional additional ingredient, such as a an inorganic salt, a formate salt, a buffering agent or a chelating agent, or any combination of the same. In some embodiments, the composition of this general category includes an amine, a viscosifier, a foaming surfactant, an oxidizing compound, an acid, or an optional additional ingredient in any of the amounts and proportions described earlier for the azo compound containing composition of general category (1). For example, a hydrazide or semicarbazide compound-containing composition may include from about 1 wt. % to about 10 wt. % of an amine compound (for example, TEPA), from about 0.1 wt. % to about 10 wt. % of viscosifier (for example, xanthan or diutan), from about 1 wt. % to about 30 wt. % of a foaming surfactant (for example, lauryl hydroxy sulfobetaine), or from about 0.1 wt. % to about 30 wt. % of an optional additional ingredient, or both. In some embodiments, a hydrazide or semicarbazide compound-containing composition includes an acid compound and has a pH of less than about 5, less than about 4, less than about 3, less than about 2, or less than about 1. In some embodiments, the composition includes a hydrazide compound or semicarbazide compound and a stoichiometric amount of an oxidizing compound (for example, sodium hypochlorite or calcium hypochlorite). In some embodiments, the composition includes a hydrazide compound or semicarbazide compound and an oxidizing compound in about 10:1, about 5:1, about 4:1, about 3:1, about 2:1, or about 3:2 molar excess with respect to the hydrazide compound or the semicarbazide compound.

In some embodiments, an amine compound, a viscosifier, a foaming surfactant, an oxidizing compound, or any of the optional additional ingredients maintain the same function in the hydrazide or semicarbazide compound-containing composition of the general category (2) as described earlier for these components in the composition of the general category (1). For example, an amine compound is an activator compound that catalyzes gas-generating decomposition reaction of the hydrazide compound or a semicarbazide compound. In some embodiments, basic pH (for example, pH of about 7.5, about 8, about 9, about 10, about 11, or about 12) or elevated temperature, or both, also facilitate decomposition reaction of the hydrazide compound or the semicarbazide compound.

In some embodiments, a hydrazide or semicarbazide compound-containing composition of general category (2) has physical properties that are same or similar to those described earlier for the composition of general category (1). For example, the hydrazide or semicarbazide compound-containing composition has density from about 70 pcf to about 150 pcf, and viscosity from about 1 cP to about 1000 cP. In another example, the hydrazide or semicarbazide compound-containing composition may be a clear yellow solution or a stable suspension in which the solid material does not settle for a prolonged period of time. In some embodiments, the hydrazide or semicarbazide compound-containing composition is stable and may be stored without undesired, premature gas generation for about 1 hour, about 5 hours, about 12 hours, about 24 hours, about 2 days, about 5 days, about a week, or about several weeks.

Examples of Hydrazide Compounds

In some embodiments, an aqueous composition of the present disclosure contains a gas-generating compound which is a hydrazide compound. In some embodiments, the hydrazide compound has Formula (IIa) or Formula (IIb):

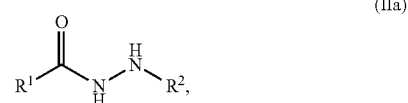

(IIa)

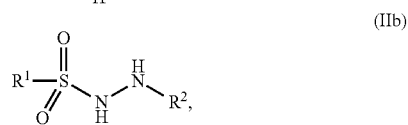

(IIb)

or a salt of the same, where: $R^1$ is selected from H, $C_{1-6}$ alkyl, $C_{2-6}$ alkenyl, $C_{3-7}$ cycloalkyl, $C_{6-10}$ aryl, and —NH—$NH_2$, where said $C_{6-10}$ aryl is optionally substituted with 1, 2, or 3 substituents independently selected from $C_{1-6}$ alkyl, hydroxyl, amino, $C_{1-6}$ alkoxy, and $NO_2$; and $R^2$ is selected from H, $C_{1-6}$ alkyl, $C_{2-6}$ alkenyl, $C_{3-7}$ cycloalkyl, $C_{6-10}$ aryl, carboxy, carbamyl, $C_{1-6}$ alkylcarbamyl, di($C_{1-6}$-alkyl)carbamyl, aminosulfonyl, $C_{1-6}$ alkylaminosulfonyl, and di($C_{1-6}$ alkyl)aminosulfonyl.

In some embodiments, $R^1$ is selected from H, $C_{1-6}$ alkyl, $C_{6-10}$ aryl, and —NH—$NH_2$, where said $C_{6-10}$ aryl is optionally substituted with 1, 2, or 3 substituents independently selected from $C_{1-6}$ alkyl, hydroxyl, amino, $C_{1-6}$ alkoxy, and $NO_2$. In some embodiments, $R^1$ is H. In some embodiments, $R^1$ is —NH—$NH_2$. In some embodiments, $R^1$ is phenyl. In some embodiments, $R^1$ is selected from $C_{1-6}$ alkyl and $C_{6-10}$ aryl, where said $C_{6-10}$ aryl is optionally substituted with 1, 2, or 3 substituents independently selected from $C_{1-6}$ alkyl, hydroxyl, amino, $C_{1-6}$ alkoxy, and $NO_2$. In some embodiments, $R^1$ is $C_{1-6}$ alkyl. In some embodiments, $R^1$ is selected from $C_{1-6}$ alkyl and $C_{6-10}$ aryl, where said $C_{6-10}$ aryl is optionally substituted with 1, 2, or 3 substituents independently selected from $C_{1-6}$ alkyl, hydroxyl, amino, $C_{1-6}$ alkoxy, and $NO_2$. In some embodiments, $R^1$ is $C_{6-10}$ aryl, which is optionally substituted with 1, 2, or 3 independently selected $C_{1-6}$ alkyl groups. In some embodiments, $R^1$ is selected from $C_{6-10}$ aryl and —NH—$NH_2$, where said $C_{6-10}$ aryl is optionally substituted with 1, 2, or 3 substituents independently selected from $C_{1-6}$ alkyl and $NO_2$.

$R^2$ is selected from H, $C_{1-6}$ alkyl, carboxy, carbamyl, $C_{1-6}$ alkylcarbamyl, di($C_{1-6}$-alkyl)carbamyl, aminosulfonyl, $C_{1-6}$ alkylaminosulfonyl, and di($C_{1-6}$ alkyl)aminosulfonyl. In some embodiments, $R^2$ is H. In some embodiments, $R^2$ is selected from carboxy, carbamyl, and aminosulfonyl. In some embodiments, $R^2$ is selected from H, carboxy, carbamyl, and aminosulfonyl. In some embodiments, $R^2$ is selected from $C_{1-6}$ alkylcarbamyl, di($C_{1-6}$-alkyl)carbamyl, $C_{1-6}$ alkylaminosulfonyl, and di($C_{1-6}$ alkyl)aminosulfonyl. In some embodiments, $R^2$ is carboxy. In some embodiments, $R^2$ is carbamyl. In some embodiments, $R^2$ is aminosulfonyl. In some embodiments, $R^2$ is selected from H, carboxy, carbamyl, and aminosulfonyl.

In some embodiments, $R^1$ is selected from $C_{1-6}$ alkyl and $C_{6-10}$ aryl, where said $C_{6-10}$ aryl is optionally substituted with 1, 2, or 3 substituents independently selected from $C_{1-6}$ alkyl, hydroxyl, amino, $C_{1-6}$ alkoxy, and $NO_2$; and $R^2$ is selected from H, carboxy, carbamyl, and aminosulfonyl.

In some embodiments, $R^1$ is $C_{1-6}$ alkyl and $R^2$ is H. In some embodiments, $R^1$ is $C_{6-10}$ aryl, which is optionally substituted with 1, 2, or 3 substituents independently selected $C_{1-6}$ alkyl groups; and $R^2$ is H.

In some embodiments, the compound of Formula (IIa) is a carbohydrazide (also known as 1,3-diaminourea, CAS Registry No. 497-18-7) having the following structure:

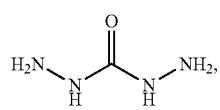

or a salt of the same.

In some embodiments, the compound of Formula (IIa) is selected from any one of the following compounds:

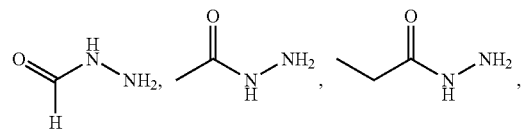

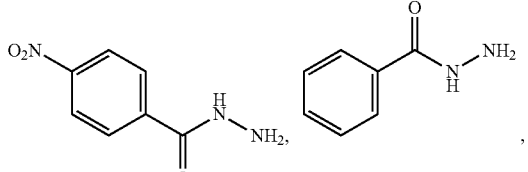

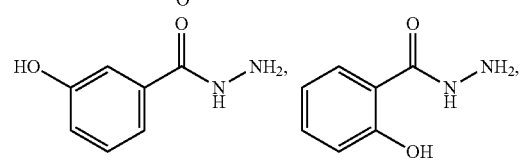

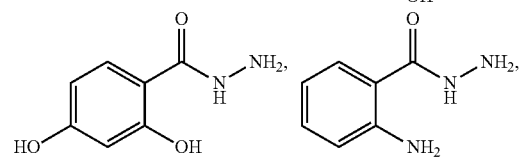

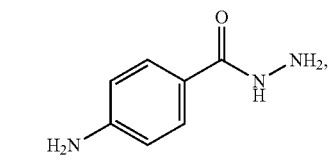

-continued

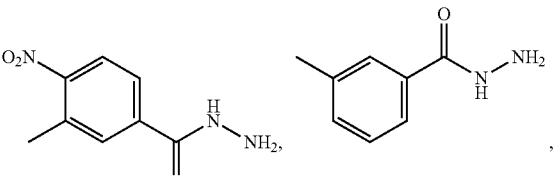

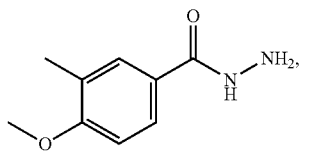

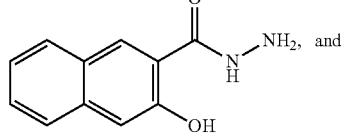

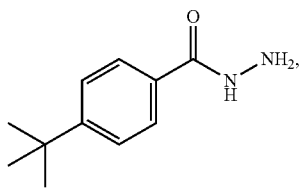

or a salt of the same.

In some embodiments, the compound of Formula (IIb) is a p-toluenesulfonyl hydrazide (also known as tosylhydrazide, CAS Registry No. 1576-35-8) having the following structure:

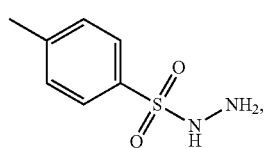

or a salt of the same.

In some embodiments, the compound of Formula (IIb) is selected from any one of the following compounds:

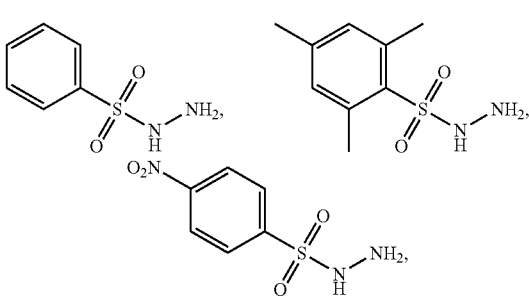

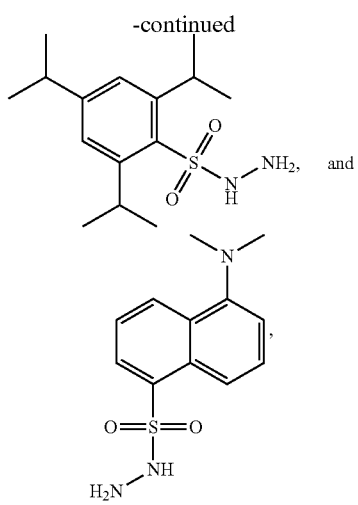

or a salt of the same.

In some embodiments, the hydrazide compound is selected from carbohydrazide and p-toluenesulfonyl hydrazide, or a salt of the same.

In some embodiments, hydrazide compound in the aqueous composition is a gas-generating chemical. That is, without being bound to any particular theory, it is believed that upon reaction with an oxidizer, hydrazide compound is converted to a corresponding azo compound, which, it turn, decomposes to produce gaseous compounds. Example dehydrogenation reaction of hydrazide compounds of Formulae (IIa) and (IIb) to form corresponding azo compounds of Formulae (VIa) and (VIb), respectively, is shown in Scheme 5.

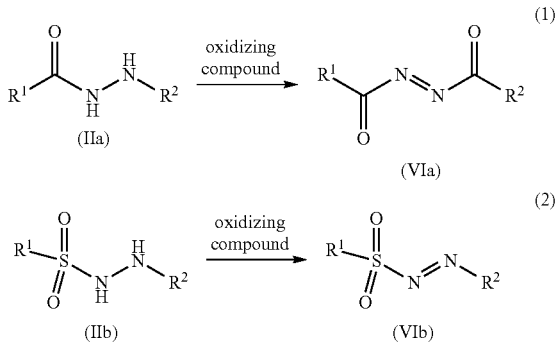

Depending on the actual chemical structure of the hydrazide compound of Formula (IIa) or (IIb), nitrogen gas, carbon monoxide, carbon dioxide, ammonia, lower alkyl amines, alkylene (for example, ethylene, propylene, or isobutene), or any combinations of the same, may be released upon decomposition of the corresponding azo compound of Formula (VIa) or (VIb). Example decomposition reactions of selected azo compounds are shown in Schemes 1, 2, and 3 described earlier.

In some embodiments, hydrazide compound in the aqueous composition is an amine activator compound that catalyzes decomposition reaction of an azo compound. In some aspects of these embodiments, the hydrazide compound is carbohydrazide, formohydrazide or a $C_{1-6}$ alkyl hydrazide.

In some embodiments, an aqueous gas-generating composition includes an azo compound, a hydrazide compound, and an amine compound of any one of Formulae (IVa)-(IVc), or a salt of the same. In some aspects of these embodiments, amount of azo compound is from about 1 wt. % to about 10 wt. %. In other aspects of these embodiments, amount of hydrazide in the composition is from about 1 wt. % to about 10 wt. %. In yet other aspects of these embodiments, amount of an amine compound of any one of Formulae (IVa)-(IVc), or a salt of the same, is from about 1 wt. % to about 10 wt. %.

In some embodiments, an aqueous gas-generation composition includes azodicarbonamide, or a salt of the same, and carbohydrazide, or a salt of the same. In some aspects of these embodiments, amount of azodicarbonamide is from about 1 wt. % to about 10 wt. %. In other aspects of these embodiments, amount of carbohydrazide in the composition is from about 1 wt. % to about 10 wt. %. In yet other aspects of these embodiments, the composition also includes an amine compound of any one of Formulae (IVa)-(IVc), or a salt of the same.

In some embodiments, the composition contains a hydrazide compound in an amount from about 1 wt. % to about 10 wt. %, and an oxidizing compound (for example, sodium hypochlorite or calcium hypochlorite) in about 1:1 molar ratio with the hydrazide compound. In other embodiments, the composition contains a hydrazide compound in an amount from about 1 wt. % to about 10 wt. %, and an oxidizing compound (for example, sodium hypochlorite or calcium hypochlorite) in about 10:1, about 8:1, about 5:1, about 3:1, about 2:1, or about 3:2 molar excess with respect to the hydrazide compound.

In some embodiments, the composition contains p-toluenesulfonyl hydrazide in an amount from about 1 wt. % to about 10 wt. %, and an oxidizing compound (for example, sodium hypochlorite or calcium hypochlorite) in about 1:1 molar ratio with the p-toluenesulfonyl hydrazide. In other embodiments the composition contains p-toluenesulfonyl hydrazide in an amount from about 1 wt. % to about 10 wt. %, and an oxidizing compound (for example, sodium hypochlorite or calcium hypochlorite) in about 10:1, about 8:1, about 5:1, about 3:1, about 2:1, or about 3:2 molar excess with respect to the p-toluenesulfonyl hydrazide.

Examples of Semicarbazide Compounds

In some embodiments, an aqueous composition of the present disclosure contains a gas-generating compound which is a semicarbazide compound. In some embodiments, the semicarbazide compound has Formula (III):

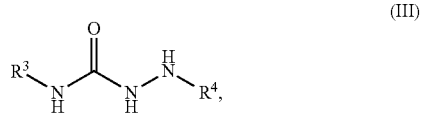

or a salt of the same, where: $R^3$ is selected from H, $C_{1-6}$ alkyl, $C_{2-6}$ alkenyl, $C_{3-7}$ cycloalkyl, and $C_{6-10}$ aryl; and $R^4$ is selected from H, $C_{1-6}$ alkyl, $C_{2-6}$ alkenyl, $C_{3-7}$ cycloalkyl, $C_{6-10}$ aryl, carboxy, carbamyl, $C_{1-6}$ alkylcarbamyl, di($C_{1-6}$-alkyl)carbamyl, aminosulfonyl, $C_{1-6}$ alkylaminosulfonyl, di($C_{1-6}$ alkyl)aminosulfonyl, C(=O)$C_{1-6}$ alkyl, C(=O) $C_{6-10}$ aryl, S(=O)$_2C_{1-6}$ alkyl, and S(=O)$_2C_{6-10}$ aryl; where said $C_{6-10}$ aryl in $R^3$ or $R^4$ is optionally substituted with 1, 2, or 3 substituents independently selected from $C_{1-6}$ alkyl, hydroxyl, amino, $C_{1-6}$ alkoxy, and $NO_2$.

In some embodiments, $R^3$ is selected from H, $C_{1-6}$ alkyl, and $C_{6-10}$ aryl. In some embodiments, $R^3$ is H. In some embodiments, $R^3$ is $C_{1-6}$ alkyl. In some embodiments, $R^3$ is $C_{6-10}$ aryl optionally substituted with 1, 2, or 3 substituents selected from $C_{1-6}$ alkyl, hydroxyl, amino, $C_{1-6}$ alkoxy, and $NO_2$.

In some embodiments, $R^4$ is selected from H, $C_{1-6}$ alkyl, $C_{6-10}$ aryl, carboxy, carbamyl, $C(=O)C_{1-6}$ alkyl, $C(=O)C_{6-10}$ aryl, $S(=O)_2C_{1-6}$ alkyl, and $S(=O)_2C_{6-10}$ aryl; where said $C_{6-10}$ aryl is optionally substituted with 1, 2, or 3 substituents independently selected from $C_{1-6}$ alkyl, hydroxyl, amino, $C_{1-6}$ alkoxy, and $NO_2$. In some embodiments, $R^4$ is selected from H and $C_{1-6}$ alkyl. In some embodiments, $R^4$ is selected from $C_{1-6}$ alkylcarbamyl, di($C_{1-6}$-alkyl)carbamyl, aminosulfonyl, $C_{1-6}$ alkylaminosulfonyl, and di($C_{1-6}$ alkyl)aminosulfonyl. In some embodiments, $R^4$ is selected from carboxy, carbamyl, $C(=O)C_{1-6}$ alkyl, $C(=O)C_{6-10}$ aryl, $S(=O)_2C_{1-6}$ alkyl, and $S(=O)_2C_{6-10}$ aryl; where said $C_{6-10}$ aryl is optionally substituted with 1, 2, or 3 substituents independently selected from $C_{1-6}$ alkyl, hydroxyl, amino, $C_{1-6}$ alkoxy, and $NO_2$. In some embodiments, $R^4$ is selected from carboxy and carbamyl. In some embodiments, $R^4$ is selected from $C(=O)C_{1-6}$ alkyl, $C(=O)C_{6-10}$ aryl, $S(=O)_2C_{1-6}$ alkyl, and $S(=O)_2C_{6-10}$ aryl; where said $C_{6-10}$ aryl is optionally substituted with 1, 2, or 3 substituents independently selected from $C_{1-6}$ alkyl, hydroxyl, amino, $C_{1-6}$ alkoxy, and $NO_2$. In some embodiments, $R^4$ is selected from $C(=O)C_{6-10}$ aryl and $S(=O)_2C_{6-10}$ aryl; where said $C_{6-10}$ aryl is optionally substituted with 1, 2, or 3 substituents independently selected from $C_{1-6}$ alkyl, hydroxyl, amino, $C_{1-6}$ alkoxy, and $NO_2$. In some embodiments, $R^4$ is H. In some embodiments, $R^4$ is $C(=O)C_{1-6}$ alkyl. In some embodiments, $R^4$ is $C(=O)C_{6-10}$ aryl, where said $C_{6-10}$ aryl is optionally substituted with 1, 2, or 3 substituents independently selected from $C_{1-6}$ alkyl, hydroxyl, and $NO_2$. In some embodiments, $R^4$ is $S(=O)_2C_{1-6}$ alkyl. In some embodiments, $R^4$ is $S(=O)_2C_{6-10}$ aryl, where said $C_{6-10}$ aryl is optionally substituted with 1, 2, or 3 substituents independently selected from $C_{1-6}$ alkyl, hydroxyl, and $NO_2$. In some embodiments, $R^4$ is $S(=O)_2C_{6-10}$ aryl, where said $C_{6-10}$ aryl is optionally substituted with 1, 2, or 3 independently selected $C_{1-6}$ alkyl groups.

In some embodiments, $R^3$ is selected from H, $C_{1-6}$ alkyl, and $C_{6-10}$ aryl, and $R^4$ is selected from H, $C_{1-6}$ alkyl, carboxy, carbamyl, $C(=O)C_{1-6}$ alkyl, $C(=O)C_{6-10}$ aryl, $S(=O)_2C_{1-6}$ alkyl, and $S(=O)_2C_{6-10}$ aryl.

In some embodiments, $R^3$ is selected from H, $C_{1-6}$ alkyl, and $C_{6-10}$ aryl, and $R^4$ is selected from carboxy, carbamyl, $C(=O)C_{1-6}$ alkyl, $C(=O)C_{6-10}$ aryl, $S(=O)_2C_{1-6}$ alkyl, and $S(=O)_2C_{6-10}$ aryl; where said $C_{6-10}$ aryl is optionally substituted with 1, 2, or 3 substituents independently selected from $C_{1-6}$ alkyl, hydroxyl, amino, $C_{1-6}$ alkoxy, and $NO_2$.

In some embodiments, $R^3$ is selected from H, $C_{1-6}$ alkyl, and $C_{6-10}$ aryl, and $R^4$ is selected from $C(=O)C_{1-6}$ alkyl, $C(=O)C_{6-10}$ aryl, $S(=O)_2C_{1-6}$ alkyl, and $S(=O)_2C_{6-10}$ aryl; where said $C_{6-10}$ aryl is optionally substituted with 1, 2, or 3 substituents independently selected from $C_{1-6}$ alkyl, hydroxyl, amino, $C_{1-6}$ alkoxy, and $NO_2$.

In some embodiments, $R^3$ is selected from H and $C_{1-6}$ alkyl, and $R^4$ is $S(=O)_2C_{6-10}$ aryl, where said $C_{6-10}$ aryl is optionally substituted with 1, 2, or 3 independently selected $C_{1-6}$ alkyl groups.

In some embodiments, the compound of Formula (III) is a hydrazinecarboxamide (also known as aminourea or semicarbazide CAS Registry No. 57-56-7) having the following structure:

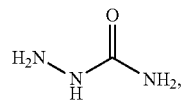

or a salt of the same.

In some embodiments, the compound of Formula (III) is a p-toluenesulfonyl semicarbazide (also known as tosylsemicarbazide, CAS Registry No. 10396-10-8) having the following structure:

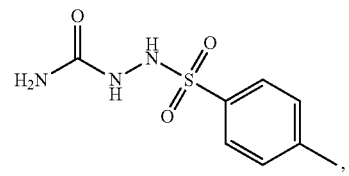

or a salt of the same.

In some embodiments, the compound of Formula (III) is selected from any one of the following compounds:

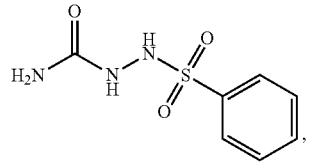

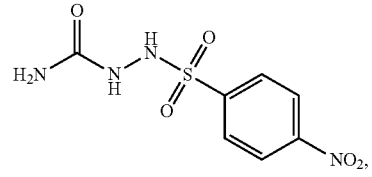

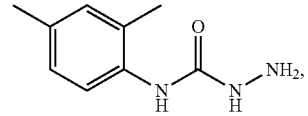

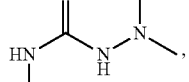

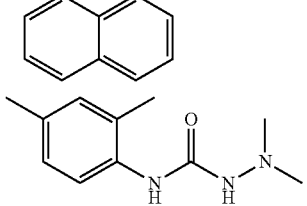

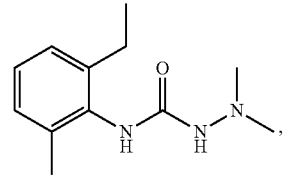

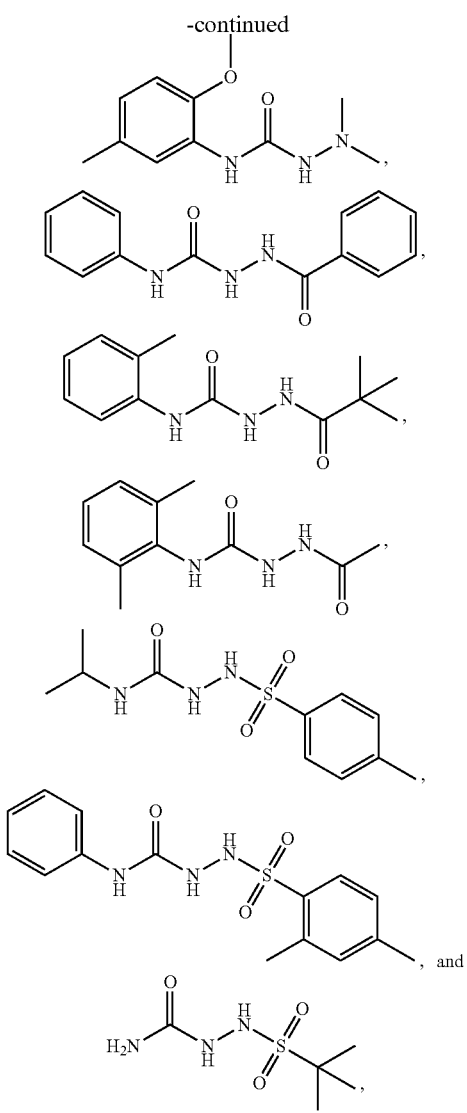

or a salt of the same.

In some embodiments, semicarbazide compound in the aqueous composition is a gas-generating chemical. That is, without being bound to any particular theory, it is believed that upon reaction with an oxidizer, semicarbazide compound is converted to a corresponding azo compound, which, it turn, decomposes to produce gaseous compounds. Example dehydrogenation reaction of semicarbazide compound of Formula (III) to form corresponding azo compounds of Formula (VII) is shown in Scheme 6.

Scheme 6

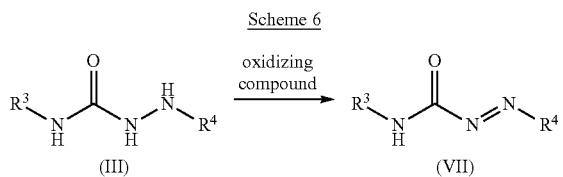

Depending on the actual chemical structure of the semicarbazide compound, nitrogen gas, carbon monoxide, carbon dioxide, ammonia, lower alkyl amines, alkylenes (for example, ethylene, propylene, or isobutene), or any combinations of the same, may be released upon decomposition of the corresponding azo compound. Example decomposition reactions of selected azo compounds are shown in Schemes 1, 2, and 3 described earlier.

In some embodiments, semicarbazide compound in the aqueous composition is an amine activator compound that catalyzes decomposition reaction of an azo compound. In some aspects of these embodiments, the semicarbazide compound is hydrazinecarboxamide or p-toluenesulfonyl hydrazide.

In some embodiments, the composition contains a semicarbazide compound in an amount from about 1 wt. % to about 10 wt. %, and an oxidizing compound (for example, sodium hypochlorite or calcium hypochlorite) in about 1:1 molar ratio with the semicarbazide compound. In other embodiments the composition contains a semicarbazide compound in an amount from about 1 wt. % to about 10 wt. %, and an oxidizing compound (for example, sodium hypochlorite or calcium hypochlorite) in about 10:1, about 8:1, about 5:1, about 3:1, about 2:1, or about 3:2 molar excess with respect to the semicarbazide compound.

In some embodiments, the composition contains p-toluenesulfonyl semicarbazide in an amount from about 1 wt. % to about 10 wt. %, and an oxidizing compound (for example, sodium hypochlorite or calcium hypochlorite) in about 1:1 molar ratio with the p-toluenesulfonyl semicarbazide. In other embodiments the composition contains p-toluenesulfonyl semicarbazide in an amount from about 1 wt. % to about 10 wt. %, and an oxidizing compound (for example, sodium hypochlorite or calcium hypochlorite) in about 10:1, about 8:1, about 5:1, about 3:1, about 2:1, or about 3:2 molar excess with respect to the p-toluenesulfonyl semicarbazide.

Salts of Acidic and Basic Compounds

In some embodiments, a salt of a compound of any one of Formulae disclosed herein (for example, azo compound, hydrazide compound, semicarbazide compound, amine compound, hydrazine compound, ethyleneimine derived compounds, or a polyethyleneimine) is formed between an acid and a basic group of the compound, such as an amino functional group, or a base and an acidic group of the compound, such as a carboxyl functional group. According to another embodiment, the salt of the compound is an acid addition salt, or a base addition salt.

In some embodiments, acids commonly employed to form salts of the compounds of any one of the Formulae disclosed herein include inorganic acids such as hydrochloric acid, sulfuric acid and phosphoric acid, as well as organic acids such as p-toluenesulfonic acid, salicylic acid, tartaric acid, bitartaric acid, ascorbic acid, maleic acid, fumaric acid, gluconic acid, glucuronic acid, formic acid, glutamic acid, methanesulfonic acid, ethanesulfonic acid, benzenesulfonic acid, lactic acid, oxalic acid, para-bromophenylsulfonic acid, carbonic acid, succinic acid, citric acid, benzoic acid and acetic acid, as well as related inorganic and organic acids. Such salts thus include sulfate, pyrosulfate, bisulfate, sulfite, bisulfite, phosphate, monohydrogenphosphate, dihydrogenphosphate, metaphosphate, pyrophosphate, chloride, bromide, iodide, acetate, propionate, decanoate, caprylate, formate, isobutyrate, caprate, heptanoate, propiolate, oxalate, malonate, succinate, suberate, sebacate, fumarate, maleate, butyne-1,4-dioate, hexyne-1,6-dioate, benzoate, chlorobenzoate, methylbenzoate, hydroxybenzoate, methoxybenzoate, phthalate, terephthalate, sulfonate, xylene sulfonate, phenylacetate, phenylpropionate, phenylbutyrate, citrate, lactate, O-hydroxybutyrate, glycolate, maleate, tartrate, methanesulfonate, propanesulfonate, naphthalene-1-sulfonate, naphthalene-2-sulfonate, mandelate and other salts. In one embodiment, acid addition salts include those formed with mineral acids such as hydrochloric acid and sulfuric acid, and those formed with organic acids such as acetic acid.

In some embodiments, bases commonly employed to form salts of the compounds of any one of the Formulae disclosed herein include hydroxides of alkali metals, including sodium, potassium, and lithium; hydroxides of alkaline earth metals such as calcium and magnesium; hydroxides of other metals, such as aluminum and zinc; ammonia, organic amines such as unsubstituted or hydroxyl-substituted mono-, di-, or tri-alkylamines, dicyclohexylamine; tributyl amine; pyridine; N-methyl, N-ethylamine; diethylamine; triethylamine; mono-, bis-, or tris-(2-OH—$C_{1-6}$ alkyl amine), such as N,N-dimethyl-N-(2-hydroxyethyl)amine or tri-(2-hydroxyethyl)amine; N-methyl-D-glucamine; morpholine; thiomorpholine; piperidine; pyrrolidine; and amino acids such as arginine, lysine, and the like. In some embodiments, the compounds of any one of Formulae disclosed herein, or salts of the same, are substantially isolated.

In a similar manner, any composition described here may be readily prepared by a skilled engineer using methods and apparatuses generally known in chemical engineering for mixing, suspending and dissolving organic chemicals in an aqueous solvent. For example, a round-bottom mixing tank, a cone bottom mixing tank, or a flat bottom chemical mixing tank. A chemical engineer will also be able to choose tools and instruments for quality control measurements, such as monitoring pH, viscosity, density and also sedimentation and generation of bubbles of gas in the composition.

In some embodiments, preparation of a gas-generating composition includes adding an amine compound to an acidic aqueous solution, adding a gas-generation compound to the resultant composition, and, if necessary, adding an acid to adjust pH of the composition to a desired value (for example, 1, 2, 3, or 4). In some aspects of these embodiments, the acidic aqueous solution contains a viscosifier or a foaming surfactant, or both.

In some embodiments, preparation of a gas-generating composition includes adding amino compound and a gas generating compound (simultaneously or sequentially) to an aqueous solution, and adjusting pH of the resultant composition to a desired value. In some embodiments, preparation of a gas-generating composition includes adding a gas-generating compound to an aqueous solution, adding an acid to adjust pH of the composition to a desired value, adding amine compound to the resultant composition, and, if necessary, adding an additional amount of acid to adjust pH of the composition to the desired value. In some aspects of the foregoing embodiments, aqueous solution contains a viscosifier or a foaming surfactant, or both.

In some embodiments, an oxidizer may be admixed with the gas-generating composition. In these embodiments, the oxidizer may be added to the composition immediately before using the composition in downhole operations. In one example, the oxidizing agent is added to the wellbore treatment fluid either before or after adding the gas generating aqueous composition to the treatment fluid.

Methods of Using

In a general aspect, the present application provides a method of using an aqueous gas-generating composition of the present disclosure to modulate density of wellbore fluids. In some embodiments, the method includes adding the aqueous gas-generating composition to a wellbore fluid to obtain a wellbore fluid with variable density. In some embodiments, volume ratio of the aqueous gas-generating composition to the wellbore fluid is from about 10:1 to about 1:10, from about 8:1 to about 1:8, from about 5:1 to about 1:5, from about 3:1 to about 1:3, from about 2:1 to about 1:2, or from about 1:1 to about 1:2. In some embodiments, volume ratio of the aqueous gas-generating composition to the wellbore fluid is about 5:1, about 3:1, about 2:1, about 3:2, about 1:1, about 2:3, about 1:2, about 1:3, or about 1:5.

In some embodiments, an amount of gas-generating compound (for example, azo compound) in the wellbore fluid with variable density is from about 0.1 wt. % to about 10 wt. %, from about 0.2 wt. % to about 8 wt. %, from about 0.5 wt. % to about 5 wt. %, from about 1 wt. % to about 4 wt. %, or from about 1 wt. % to about 3 wt. %. In some embodiments, an amount of gas-generating compound in wellbore fluid with variable density is about 0.5 wt. %, about 1 wt. %, about 1.5 wt. %, about 2 wt. %, about 3 wt. %, about 4 wt. %, or about 5 wt. %.

In some embodiments, an amount of foaming surfactant is the wellbore fluid with variable density is from about 1 wt. % to about 20 wt. %, from about 2 wt. % to about 15 wt. %, or from about 5 wt. % to about 10 wt. %. In some embodiments, an amount of foaming surfactant is the wellbore fluid with variable density is about 3 wt. %, about 5 wt. %, about 6 wt. %, about 8 wt. %, about 10 wt. %, about 12 wt. %, or about 15 wt. %.

In some embodiments, adding the gas-generating composition to the wellbore fluid, for example, a cement slurry, increases compressibility of the fluid. In some embodiments, increased compressibility leads to variable density of the fluid. In some embodiments, variable density of a wellbore fluid leads to wellbore stability and smooth operation. Wellbore fluids where variable density and increased compressibility are desired include drilling fluids, carrier fluids, fracturing fluids, spotting fluids, cementing fluids, completion fluids, stimulation fluids, remedial fluids and clean-up fluids.

In some embodiments, variable density is achieved by activating a gas generating compound in the wellbore fluid to produce gaseous compounds (for example, bubbles of gas). Without being bound to any particular theory, it is believed that gases are more compressible than pure liquids. Hence, when bubbles of gas are dispersed in the liquid carrier, the resultant composition is more compressible than the pure liquid carrier without any gas dispersed in it.

In some embodiments, the gas-generating compound in the wellbore fluid may be activated by temperature in the wellbore (for example, any temperature described herein for activating azo compound, hydrazide compound, or semicarbazide compound). In some embodiments, the gas generating compound in the wellbore fluid may be activated by basic pH (for example pH or about 7.5, about 8, about 9, about 10, about 11, or about 12). For example, a gas-generating compound may be activated to produce gas when a storable aqueous gas-generating composition having pH of about 2 is added to a wellbore fluid having pH of about 12, and the resultant wellbore fluid containing the gas-generating compound has pH of about 5 or greater. In some embodiments, a solution of a base such as NaOH may be added to the wellbore fluid consecutively or concurrently with the aqueous gas-generating composition to achieve the desired pH value in the wellbore fluid (for example, pH or about 5, about 6, about 7, about 9, about 11, or about 12). In some embodiments, aqueous gas-generating composition as described earlier may be prepared beforehand and safely stored for a prolonged period of time before application (for example, the gas-generating composition may be produced at a dedicated production facility and transported to the wellbore site for application). In other embodiments, a gas-generating composition may be prepared immediately before application, for example, by mud engineer, from the individual components. In some embodiments, an oxidizing compound may be added to the wellbore fluid consecutively or concurrently with the aqueous gas-generating composition. In some embodiments an oxidizing compound may be added to the aqueous gas-generating composition immediately before admixing the composition with the wellbore fluid. In such embodiments, the gas generating composition and the oxidizing compound may be stored or transported to the wellbore application site separately. In some embodiments, an aqueous gas-generating compound is admixed with the wellbore fluid at the application site, for example, using a mixer tank. In some embodiments, a liquid injection pump is utilized to inject the gas-generating composition into a wellbore treatment fluid on-the-fly in a continuous operation. In some embodiments, an oxidizer compound is batch mixed with the gas-generating composition or with the wellbore fluid on site. In some embodiments, the oxidizing compound is injected downhole using a liquid injection pump. In some embodiments, the gas generation is activated by any of the aforementioned activation factors, or any combination of the same. In some embodiments, gas generation is activated by pH of the wellbore fluid greater than 5 (for example, pH above 6, above 7, or above 8) and by temperature in the wellbore greater than 100° C.

The methods described earlier advantageously allow for introducing small amounts of gas to the wellbore fluid. In some embodiments, volume fraction of gas in the wellbore fluid generated by the present composition is from about 0.1 v/v % to about 50 v/v %, from about 1 v/v % to about 25 v/v %, or from about 1 v/v % to about 10 v/v % based on the amount of the wellbore fluid.

Controlled compressibility may be also desired in wellbore set cement applications. In primary cementing, inclusion of small amounts of gas in the cement mixture may be advantageous for improved resiliency and reduced brittleness of set cement. In one aspect, the present application provides a method of using an aqueous gas-generating composition of the present disclosure to modulate density of set cement. In some embodiments, the method includes adding an aqueous gas-generating composition to the cement mixture prior to pumping the cement mixture downhole. In some embodiments, the method includes injecting the aqueous gas-generating composition downhole to mix with the cementing mixture. In some embodiments, the gas-generating compound is activated before the cement sets. In such embodiments the set cement includes bubbles of gas. Without being bound to any particular theory, it is believed that bubbles of gas in set cement provide increased compressibility to the cement. This is advantageous, because in an event of sudden pressure increase, set cement will not collapse but rather compress the bubbles of gas in the cement material in an elastic manner.

EXAMPLES

Materials and General Methods

Aqueous suspensions/solutions of gas generating compositions were prepared by stirring the nitrogen generating chemical(s) in 10 ml of 0.6 wt. % solution of xanthan. The initial pH was measured. Either concentrated or pre-diluted hydrochloric acid or glacial acetic acid was added and the pH was measured. The solutions were observed for gas generation upon storage at room temperature. Where noted, a hydroxyl sulfobetaine-based foaming surfactant was added during the preparation of the composition. In some experiments, the acid was added to the xanthan solution, to adjust the pH to a specified value and then the gas generating chemical was added.

Example 1

Initial pH of the 0.6 wt. % xanthan solution was 5.85. Into 10 ml of this xanthan solution, 0.3 ml of dilute HCl (2:1 dilution) was added. The resulting solution had a pH of 0.72. To one batch of the acidified xanthan solution, 0.5 g carbohydrazide was added. The mixture was stirred to dissolve (4.8 wt. % carbohydrazide solution). The resulting solution had a pH 4.58. Into this solution, 0.5 g azodicarbonamide was added. The mixture was stirred to obtain a yellow homogeneous suspension (4.8 wt. % azodicarbonamide suspension). The resulting suspension had a pH 4.60. Additional 0.1 ml of dilute HCl was added to this suspension to reduce pH of the suspension to 4.40. After 24 hours, few bubbles were observed in the mixture, and color of the suspension was still bright yellow indicating the presence of the unreacted azo compound. The pH changed from 0.72 to 4.58 to 4.60 indicating that carbohydrazide was a basic compound, whereas the azo compound was essentially a neutral compound.

Example 2

A storable composition was obtained using methods and procedures analogous to those described in Example 1, with 1.25 g (10 wt. %) carbohydrazide and 1.25 g azodicarbonamide (10 wt. %). About 0.5 ml of dilute hydrochloric acid (1:1 dilution) was added prior to addition of the nitrogen compounds to reduce pH of the fluid to 4.5. Results after 24-hour storage were similar to those of Example 1. Number of $N_2$ bubbles increased in 48 hours, and the suspension became a paste with a light yellow color. The results lead to a conclusion that the compositions could be stored for at least 24 hours without or with only a slight loss in the $N_2$-generating activity.

Example 3

Into 10 ml of 0.6 wt. % xanthan solution, 0.4 g carbohydrazide (3.7 wt. %) and 0.4 g (3.8 wt. %) azodicarbonamide were added and stirred to obtain a homogeneous suspension. Concentrated hydrochloric acid (about 0.35 ml) was added to decrease pH of the fluid from 6.4 to 3.5. Fluidity of the suspension remained stable and unchanged for 4 days, and only a few visible bubbles were formed.

Example 4

In this experiment, azodicarbonamide (0.5 g, 4.5 wt %) and carbohydrazide (0.5 g, 4.5 wt %) were added and stirred to obtain a uniform suspension. Concentrated hydrochloric acid was added to reduce the pH to 2.4. In 24 hours, there were no bubbles formed, and the fluidity remained unchanged. The pH was also unchanged. The suspension was stable for one week without formation of any gas.

The results of experiments of Examples 1-4 are summarized in Table 1.

TABLE 1

| azodi-carbonamide, wt. % | amount of carbohydrazide, wt. % | pH of stored solution | stability of stored soln. |
|---|---|---|---|
| 4.8 | 4.8 | 4.4 | few gas bubbles in 24 hours |
| 10 | 10 | 4.5 | few bubbles in 24 hours; turned to paste in 48 hr |
| 3.8 | 3.7 | 3.5 | suspension remained fluid for 4 days; few bubbles present |
| 4.5 | 4.5 | 2.4 | Stable for at least 7 days with no bubbles |

The results of Examples 1-4 summarized in Table 1 show that the gas generating material and an activator can be combined to form stable storable suspensions for prolonged periods of time by reducing pH of composition less than 5 (preferably less than 4) using an acid compound.

Example 5

A xanthan solution (0.6 wt. %) was used as a simulated wellbore treatment fluid. Into 22 g of this xanthan solution, an aqueous solution of cocoamidopropyl hydroxysulfo-betaine (supplied as 50% active in an aqueous solution) foaming surfactant (4 ml or 4.5 g, 15.4% by volume of the total fluid) was added, and divided into three batches of 7.5 g each (about 7.5 ml). To each of these solutions, 3.5 g of the gas generating composition was added. The gas generating composition was prepared as described in Example 3 and stored for one week prior to use. pH of the final solutions was 2.9. To each one of these solutions taken in graduated transparent centrifuge tubes, different volumes of 0.5 N sodium hydroxide solution was added and gas evolution was measured as a function of time and pH. Results or these experiments are shown in Table 2. In this example, sodium hydroxide was used as the activator to generate gas on demand in the wellbore treatment fluid.

TABLE 2

| Volume of 0.5N NaOH, ml | pH of final solution | volume of Final fluid, ml | final conc. of gas generating chemicals, wt. % | final conc. of foaming surfactant, v/v % | amount of gas generated, ml | % foam in the final fluid at room temp. |
|---|---|---|---|---|---|---|
| 2 | 3.95 | 13 | 2.45 | 8.9 | no gas in 15 min | 0% in 15 min |
| 4 | 5.03 | 15 | 2.13 | 7.67 | 5 ml in 10 min | 25% in 10 min |
| 8 | 12.32 | 19 | 1.68 | 6.05 | 22 ml in 5 min | 54% in 5 min |

The next set of experiments was conducted in 0.5 wt. % diutan viscosifier solution.

Example 6

A suspension of 0.5 g azodicarbonamide (4.8 wt. %) in 10 ml diutan solution was prepared. Concentrated HCl (about 0.1 ml) was added to the suspension to reduce the pH from 8.25 to 1.6. In a parallel experiment, 0.5 g carbohydrazide (4.8 wt. %) was added to the diutan solution and stirred until completely dissolved. Concentrated HCl (about 0.5 ml) was added to reduce the pH from 8.74 to 2.2. In a third experiment, both azodicarbonamide (0.5 g, 4.8 wt. %) and carbohydrazide (0.5 g, 4.8 wt. %) were added to 10 ml of diutan solution. Concentrated HCl (about 0.4 ml) was added to reduce the pH to 2.8. None of the three fluids generated any gas in 24 hours, and all of them remained fluid for at least 48 hours. There were a few gas bubbles present in all the fluids after 48 hours. The initial fluid volumes immediately after preparation were 12.5 ml each.

Example 7

Into three graduated cylinders, 5.2 g of each of the three fluids prepared in Example 6 was added. The hydroxysulfo-betaine foaming surfactant solution was added to each of the fluid in amounts of 0.2 ml and stirred. Finally, two grams of magnesium oxide was added to each cylinder, and gas generation was monitored at room temperature as a function of time. The starting fluid volume was 7 ml. Results are shown in Table 3.

TABLE 3

| Azodicarbonamide | Carbohydrazide | Fluid volume, ml | Volume measurement time | % Gas in the fluid |
|---|---|---|---|---|
| present | present | 11 | 23 min | 36 |
|  |  | 20 | 80 min | 65 |
|  |  | 24 | 120 min | 71 |
|  |  | 27 | 180 min | 74 |
|  |  | 30 | 20 hours | 77 |
| present | absent | 7 | 180 min | 0 |
|  |  | 7 | 70 min | 0 |
|  |  | 7 | 100 min | 0 |
|  |  | 12 | 20 hours | 42 |
| absent | present | 7 | 180 min | 0 |
|  |  | 7 | 20 hours | 0 |

Results of Examples 6 and 7 show that presence of amine activator increases the amount of gas upon exposing the fluid stored at low pH to a neutralizing base (magnesium oxide). The results show that if azo compound or carbohydrazide compound is used as the sole source for gas generation in the storable gas generating aqueous composition that has made acidic to prevent premature generation, and the pH is raised, with magnesium oxide base, to levels where gas generation commences, the amount of gas generated is relatively small or none even after 20 hours. In contrast, when the combination is used, 74% gas is generated in about 3 hours. This observation indicates that carbohydrazide functions as an amine activator for generating gas from an azo compound.

OTHER EMBODIMENTS

It is to be understood that while the present application has been described in conjunction with the detailed description of the same, the foregoing description is intended to illustrate and not limit the scope of the present application, which is defined by the scope of the appended claims. Other aspects, advantages, and modifications are within the scope of the following claims.

What is claimed is:

1. An aqueous gas-generating composition comprising an azo compound of Formula (I):

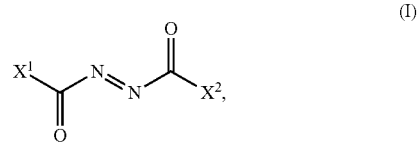

or a salt thereof, wherein:
X$^1$ and X$^2$ are each independently selected from the group consisting of C$_{1-6}$ alkyl, C$_{2-6}$ alkenyl, C$_{2-6}$ alkynyl, OR$^{a1}$, and NR$^{c1}$R$^{d1}$;
each R$^{a1}$, R$^{c1}$ and R$^{d1}$ is independently selected from the group consisting of H, C$_{1-6}$ alkyl, C$_{2-6}$ alkenyl, C$_{2-6}$ alkynyl, C$_{3-7}$ cycloalkyl, and C$_{6-10}$ aryl; and
an acid to adjust the pH to less than about 5, and wherein the composition is stable and storable without producing any substantial amount of gas for at least 24 hours.

2. The aqueous gas-generating composition of claim 1, wherein:
X$^1$ and X$^2$ are each independently selected from the group consisting of OR$^{a1}$ and NR$^{c1}$R$^{d1}$; and
each R$^{a1}$, R$^{c1}$ and R$^{d1}$ is independently selected from the group consisting of H and C$_{1-6}$alkyl.

3. The aqueous gas-generating composition of claim 2, wherein the azo compound is azodicarbonamide, or a salt thereof.

4. The aqueous gas-generating composition of claim 1, wherein pH of the composition is less than about 4.

5. The aqueous gas-generating composition of claim 1, wherein an amount of the azo compound in the aqueous composition is from about 1 wt. % to about 10 wt. %.

6. The aqueous gas-generating composition of claim 1, comprising an amine compound which is a primary, secondary or tertiary amine of Formula (IVa):

(IVa)

or a salt thereof, wherein:
R$^{n1}$, R$^{n2}$ and R$^{n3}$ are independently selected from the group consisting of H, C$_{1-6}$ alkyl, C$_{3-7}$ cycloalkyl, and 4-7 membered heterocycloalkyl, each of which is optionally substituted with 1, 2, or 3 substituents independently selected from the group consisting of hydroxyl, C$_{1-6}$alkoxy, amino, C$_{1-6}$ alkylamino, di(C$_{1-6}$ alkyl)amino, carboxy, and carbamyl; or
any R$^{n1}$ and R$^{n2}$, or any R$^{n2}$ and R$^{n3}$, or any R$^{n1}$ and R$^{n3}$ together with the N atom to which they are attached form a 4-7 membered heterocycloalkyl, which is optionally substituted with 1, 2, 3, 4, or 5 substituents independently selected from the group consisting of C$_{1-6}$ alkyl, NH$_2$—C$_{1-6}$ alkylene, OH—C$_{1-6}$ alkylene, hydroxyl, C$_{1-6}$ alkoxy, amino, C$_{1-6}$alkylamino, di(C$_{1-6}$ alkyl)amino, carboxy, and carbamyl.

7. The aqueous gas-generating composition of claim 6, wherein:
R$^{n1}$, R$^{n2}$ and R$^{n3}$ are independently selected from the group consisting of H and C$_{1-6}$ alkyl, which is optionally substituted with 1, 2, or 3 substituents independently selected from the group consisting of hydroxyl, C$_{1-6}$ alkoxy, amino, C$_{1-6}$ alkylamino, di(C$_{1-6}$ alkyl) amino, and carboxy.

8. The aqueous gas-generating composition of claim 7, wherein the amine compound is triethanolamine, or a salt thereof.

9. The aqueous gas-generating composition of claim 1, comprising an amine compound which is a hydrazine compound of Formula (IVb):

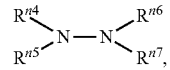

(IVb)

or a salt thereof, wherein:
R$^{n4}$, R$^{n5}$, R$^{n6}$, and R$^{n7}$ are independently selected from the group consisting of H, C$_{1-6}$ alkyl, C$_{3-7}$ cycloalkyl, and 4-7 membered heterocycloalkyl, each of which is optionally substituted with 1, 2, or 3 substituents independently selected from the group consisting of hydroxyl, C$_{1-6}$alkoxy, amino, C$_{1-6}$ alkylamino, di(C$_{1-6}$ alkyl)amino, carboxy, and carbamyl; or
any R$^{n4}$ and R$^{n5}$, or any R$^{n6}$ and R$^{n7}$, together with the N atom to which they are attached form a 4-7 membered heterocycloalkyl, which is optionally substituted with 1, 2, 3, 4, or 5 substituents independently selected from the group consisting of C$_{1-6}$ alkyl, hydroxyl, C$_{1-6}$ alkoxy, amino, C$_{1-6}$ alkylamino, di(C$_{1-6}$ alkyl)amino, carboxy, and carbamyl.

10. The aqueous gas-generating composition of claim 9, wherein
R$^{n4}$, R$^{n5}$, R$^{n6}$, and R$^{n7}$ are independently selected from the group consisting of H and C$_{1-6}$alkyl, which is optionally substituted with 1, 2, or 3 substituents independently selected from the group consisting of hydroxyl, C$_{1-6}$ alkoxy, amino, C$_{1-6}$ alkylamino, di(C$_{1-6}$ alkyl) amino, and carboxy.

11. The aqueous gas-generating composition of claim 10, wherein the hydrazine compound is selected from the group consisting of hydrazine, hydrazine monohydrobromide, hydrazine hydrate, hydrazine sulfate, hydrazine acetate, hydrazine dihydrochloride, hydrazine monohydrochloride, and hydrazine acetate.

12. The aqueous gas-generating composition of claim 1, comprising an amine compound which is an ethyleneimine compound of Formula (IVc):

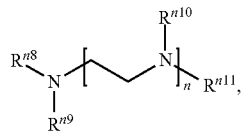

(IVc)

or a salt thereof, wherein:
n is an integer from 1 to 10,
R$^{n8}$, R$^{n9}$, R$^{n10}$, and R$^{n11}$ are independently selected from the group consisting of H, C$_{1-6}$alkyl, C$_{3-7}$ cycloalkyl, and 4-7 membered heterocycloalkyl, each of which is optionally substituted with 1, 2, or 3 substituents independently selected from the group consisting of hydroxyl, C$_{1-6}$ alkoxy, amino, C$_{1-6}$ alkylamino, di(C$_{1-6}$ alkyl)amino, carboxy, and carbamyl; or
any R$^{n8}$ and R$^{n9}$, or any R$^{n10}$ and R$^{n11}$, together with the N atom to which they are attached form a 4-7 membered heterocycloalkyl, which is optionally substituted with 1, 2, 3, 4, or 5 substituents independently selected from the group consisting of C$_{1-6}$ alkyl, NH$_2$—C$_{1-6}$alkylene, OH—C$_{1-6}$ alkylene, hydroxyl, C$_{1-6}$ alkoxy, amino, C$_{1-6}$ alkylamino, di(C$_{1-6}$ alkyl) amino, carboxy, and carbamyl.

13. The aqueous gas-generating composition of claim 12, wherein n is an integer from 1 to 8, and $R^{n8}$, $R^{n9}$, $R^{n10}$, and $R^{n11}$ are independently selected from the group consisting of H and $C_{1-6}$ alkyl, which is optionally substituted with 1, 2, or 3 substituents independently selected from the group consisting of amino, $C_{1-6}$ alkylamino, di($C_{1-6}$alkyl)amino, carboxy, and carbamyl.

14. The aqueous gas-generating composition of claim 13, wherein the ethyleneimine compound is selected from the group consisting of ethylene diamine (EDA), tetraethylene pentamine (TEPA), diethyletriamine (DETA), polyethyleneimine, and a salt thereof.

15. The aqueous gas-generating composition of claim 1, comprising an amine compound which is a hydrazide compound of Formula (IIa) or Formula (IIb):

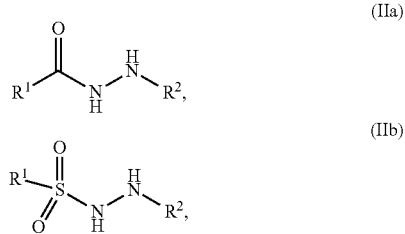

or a salt thereof, wherein:

$R^1$ is selected from the group consisting of H, $C_{1-6}$ alkyl, $C_{6-10}$ aryl, and —NH—NH$_2$, wherein said $C_{6-10}$ aryl is optionally substituted with 1, 2, or 3 substituents independently selected from the group consisting of $C_{1-6}$ alkyl, hydroxyl, amino, $C_{1-6}$ alkoxy, and NO$_2$; and $R^2$ is selected from the group consisting of H, $C_{1-6}$ alkyl, carboxy, carbamyl, $C_{1-6}$ alkylcarbamyl, di($C_{1-6}$ alkyl) carbamyl, aminosulfonyl, $C_{1-6}$ alkylaminosulfonyl, and di($C_{1-6}$alkyl)aminosulfonyl.

16. The aqueous gas-generating composition of claim 15, wherein:

$R^1$ is selected from the group consisting of $C_{6-10}$ aryl and —NH—NH$_2$, wherein said $C_{6-10}$ aryl is optionally substituted with 1, 2, or 3 substituents independently selected from the group consisting of $C_{1-6}$ alkyl and NO$_2$; and $R^2$ is selected from the group consisting of H, carboxy, carbamyl, and aminosulfonyl.

17. The aqueous gas-generating composition of claim 16, wherein the hydrazide compound is selected from the group consisting of carbohydrazide, p-toluenesulfonyl hydrazide, and a salt thereof.

18. The aqueous gas-generating composition of claim 6, wherein an amount of the amine compound in the aqueous composition is from about 1 wt. % to about 10 wt. %.

19. The aqueous gas-generating composition of claim 1, wherein the composition comprises a viscosifier selected from the group consisting of diutan and xanthan, and a hydroxy sulfobetaine group-containing foaming surfactant.

* * * * *